US009902045B2

(12) United States Patent
Breder et al.

(10) Patent No.: US 9,902,045 B2
(45) Date of Patent: Feb. 27, 2018

(54) METHOD OF USING AN ABRASIVE ARTICLE INCLUDING SHAPED ABRASIVE PARTICLES

(71) Applicants: SAINT-GOBAIN ABRASIVES, INC., Worcester, MA (US); SAINT-GOBAIN ABRASIFS, Conflans-Sainte-Honorine (FR)

(72) Inventors: Kristin Breder, Belchertown, MA (US); Sujatha Iyengar, Northborough, MA (US); Christopher Arcona, Northborough, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 154 days.

(21) Appl. No.: 14/726,021

(22) Filed: May 29, 2015

(65) Prior Publication Data

US 2015/0343603 A1 Dec. 3, 2015

Related U.S. Application Data

(60) Provisional application No. 62/005,642, filed on May 30, 2014.

(51) Int. Cl.
*B24D 11/00* (2006.01)
*C09K 3/14* (2006.01)
*B24B 1/00* (2006.01)

(52) U.S. Cl.
CPC ............ *B24D 11/00* (2013.01); *B24B 1/00* (2013.01); *C09K 3/1409* (2013.01)

(58) Field of Classification Search
CPC .......... B24D 11/00; C09K 3/1409; B24B 1/00
See application file for complete search history.

(56) References Cited

U.S. PATENT DOCUMENTS

| 345,604 | A | 7/1886 | Semper |
| 1,910,444 | A | 5/1933 | Nicholson |
| 2,049,874 | A | 8/1936 | Sherk |
| 2,148,400 | A | 2/1939 | Crompton, Jr. |
| 2,248,064 | A | 7/1941 | Carlton et al. |
| 2,248,990 | A | 7/1941 | Heany |
| 2,290,877 | A | 7/1942 | Heany |
| 2,318,360 | A | 5/1943 | Benner et al. |
| 2,376,343 | A | 5/1945 | Carlton |

(Continued)

FOREIGN PATENT DOCUMENTS

| CA | 743715 A | 10/1966 |
| CA | 2423788 A1 | 7/2002 |

(Continued)

OTHER PUBLICATIONS

3M-Cubitron-II-984f-belt Brochure, Jan. 13, 2012.*

(Continued)

*Primary Examiner* — Marc Carlson
(74) *Attorney, Agent, or Firm* — Abel Law Group, LLP; Joseph P. Sullivan

(57) ABSTRACT

A method of removing material from one or more workpieces including moving a coated abrasive article having a plurality of shaped abrasive particles relative to a surface of the one or more workpieces at high material removal rates.

20 Claims, 6 Drawing Sheets

(56) References Cited

U.S. PATENT DOCUMENTS

| | | |
|---|---|---|
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,366,523 A * | 11/1994 | Rowenhorst ............ B24D 3/14 51/293 |
| 5,366,525 A | 11/1994 | Fujiyama |

(56) References Cited

U.S. PATENT DOCUMENTS

| | | | |
|---|---|---|---|
| 5,372,620 A | 12/1994 | Rowse et al. | |
| 5,373,786 A | 12/1994 | Umaba | |
| 5,376,598 A | 12/1994 | Preedy et al. | |
| 5,376,602 A | 12/1994 | Nilsen | |
| 5,383,945 A | 1/1995 | Cottringer et al. | |
| 5,395,407 A | 3/1995 | Cottringer et al. | |
| 5,409,645 A | 4/1995 | Torre, Jr. et al. | |
| 5,429,648 A | 7/1995 | Wu | |
| 5,431,967 A | 7/1995 | Manthiram | |
| 5,435,816 A | 7/1995 | Spurgeon et al. | |
| 5,437,754 A | 8/1995 | Calhoun | |
| 5,441,549 A | 8/1995 | Helmin | |
| 5,443,603 A | 8/1995 | Kirkendall | |
| 5,447,894 A | 9/1995 | Yasuoka et al. | |
| 5,453,106 A | 9/1995 | Roberts | |
| 5,454,844 A | 10/1995 | Hibbard et al. | |
| 5,470,806 A | 11/1995 | Krstic et al. | |
| 5,479,873 A | 1/1996 | Shintani et al. | |
| 5,482,756 A | 1/1996 | Berger et al. | |
| 5,486,496 A | 1/1996 | Talbert et al. | |
| 5,496,386 A * | 3/1996 | Broberg | B24D 3/002 51/295 |
| 5,500,273 A | 3/1996 | Holmes et al. | |
| 5,514,631 A | 5/1996 | Cottringer et al. | |
| 5,516,347 A | 5/1996 | Garg | |
| 5,516,348 A | 5/1996 | Conwell et al. | |
| 5,523,074 A | 6/1996 | Takahashi et al. | |
| 5,525,100 A | 6/1996 | Kelly et al. | |
| 5,527,369 A | 6/1996 | Garg | |
| 5,543,368 A | 8/1996 | Talbert et al. | |
| 5,551,963 A | 9/1996 | Larmie | |
| 5,560,745 A | 10/1996 | Roberts | |
| 5,567,150 A | 10/1996 | Conwell et al. | |
| 5,567,214 A | 10/1996 | Ashley | |
| 5,567,251 A | 10/1996 | Peker et al. | |
| 5,571,297 A | 11/1996 | Swei et al. | |
| 5,576,409 A | 11/1996 | Mackey | |
| 5,578,095 A | 11/1996 | Bland et al. | |
| 5,578,222 A | 11/1996 | Trischuk et al. | |
| 5,582,625 A | 12/1996 | Wright et al. | |
| 5,584,896 A | 12/1996 | Broberg et al. | |
| 5,584,897 A | 12/1996 | Christianson et al. | |
| 5,591,685 A | 1/1997 | Mitomo et al. | |
| 5,593,468 A | 1/1997 | Khaund et al. | |
| 5,599,493 A | 2/1997 | Ito et al. | |
| 5,603,738 A | 2/1997 | Zeiringer et al. | |
| 5,609,706 A | 3/1997 | Benedict et al. | |
| 5,611,829 A | 3/1997 | Monroe et al. | |
| 5,618,221 A | 4/1997 | Furukawa et al. | |
| 5,628,952 A | 5/1997 | Holmes et al. | |
| 5,641,469 A | 6/1997 | Garg et al. | |
| RE35,570 E | 7/1997 | Rowenhorst et al. | |
| 5,645,619 A | 7/1997 | Erickson et al. | |
| 5,651,925 A | 7/1997 | Ashley et al. | |
| 5,656,217 A | 8/1997 | Rogers et al. | |
| 5,667,542 A | 9/1997 | Law et al. | |
| 5,669,941 A | 9/1997 | Peterson | |
| 5,669,943 A | 9/1997 | Horton et al. | |
| 5,672,097 A | 9/1997 | Hoopman | |
| 5,672,554 A | 9/1997 | Mohri et al. | |
| 5,683,844 A | 11/1997 | Mammino | |
| 5,702,811 A | 12/1997 | Ho et al. | |
| 5,725,162 A | 3/1998 | Garg et al. | |
| 5,736,619 A | 4/1998 | Kane et al. | |
| 5,738,696 A | 4/1998 | Wu | |
| 5,738,697 A | 4/1998 | Wu et al. | |
| 5,751,313 A | 5/1998 | Miyashita et al. | |
| 5,759,481 A | 6/1998 | Pujari et al. | |
| 5,776,214 A | 7/1998 | Wood | |
| 5,779,743 A | 7/1998 | Wood | |
| 5,785,722 A | 7/1998 | Garg et al. | |
| 5,810,587 A | 9/1998 | Bruns et al. | |
| 5,820,450 A | 10/1998 | Calhoun | |
| 5,830,248 A | 11/1998 | Christianson et al. | |
| 5,840,089 A | 11/1998 | Chesley et al. | |
| 5,849,646 A | 12/1998 | Stout et al. | |
| 5,855,997 A | 1/1999 | Amateau | |
| 5,863,306 A | 1/1999 | Wei et al. | |
| 5,866,254 A | 2/1999 | Peker et al. | |
| 5,876,793 A | 3/1999 | Sherman et al. | |
| 5,885,311 A | 3/1999 | McCutcheon et al. | |
| 5,893,935 A | 4/1999 | Wood | |
| 5,902,647 A | 5/1999 | Venkataramani | |
| 5,908,477 A | 6/1999 | Harmer et al. | |
| 5,908,478 A | 6/1999 | Wood | |
| 5,919,549 A | 7/1999 | Van et al. | |
| 5,924,917 A * | 7/1999 | Benedict | B24D 3/28 451/526 |
| 5,946,991 A | 9/1999 | Hoopman | |
| 5,975,987 A | 11/1999 | Hoopman et al. | |
| 5,980,678 A | 11/1999 | Tselesin | |
| 5,984,988 A | 11/1999 | Berg et al. | |
| 5,989,301 A | 11/1999 | Laconto, Sr. et al. | |
| 5,997,597 A | 12/1999 | Hagan | |
| 6,016,660 A | 1/2000 | Abramshe | |
| 6,019,805 A | 2/2000 | Herron | |
| 6,024,824 A | 2/2000 | Krech | |
| 6,027,326 A | 2/2000 | Cesarano, III et al. | |
| 6,048,577 A | 4/2000 | Garg | |
| 6,053,956 A | 4/2000 | Wood | |
| 6,054,093 A | 4/2000 | Torre, Jr. et al. | |
| 6,056,794 A * | 5/2000 | Stoetzel | B24D 3/002 51/295 |
| 6,080,215 A | 6/2000 | Stubbs et al. | |
| 6,080,216 A | 6/2000 | Erickson | |
| 6,083,622 A | 7/2000 | Garg et al. | |
| 6,096,107 A | 8/2000 | Caracostas et al. | |
| 6,110,241 A | 8/2000 | Sung | |
| 6,129,540 A | 10/2000 | Hoopman et al. | |
| 6,136,288 A | 10/2000 | Bauer et al. | |
| 6,146,247 A | 11/2000 | Nokubi et al. | |
| 6,179,887 B1 | 1/2001 | Barber, Jr. et al. | |
| 6,206,942 B1 | 3/2001 | Wood | |
| 6,228,134 B1 | 5/2001 | Erickson | |
| 6,238,450 B1 | 5/2001 | Garg et al. | |
| 6,258,137 B1 | 7/2001 | Garg et al. | |
| 6,258,141 B1 | 7/2001 | Sung et al. | |
| 6,261,682 B1 | 7/2001 | Law | |
| 6,264,710 B1 | 7/2001 | Erickson | |
| 6,277,160 B1 | 8/2001 | Stubbs et al. | |
| 6,277,161 B1 | 8/2001 | Castro et al. | |
| 6,283,997 B1 | 9/2001 | Garg et al. | |
| 6,284,690 B1 | 9/2001 | Nakahata et al. | |
| 6,287,353 B1 | 9/2001 | Celikkaya | |
| 6,306,007 B1 | 10/2001 | Mori et al. | |
| 6,312,324 B1 | 11/2001 | Mitsui et al. | |
| 6,319,108 B1 | 11/2001 | Adefris et al. | |
| 6,331,343 B1 | 12/2001 | Perez et al. | |
| 6,371,842 B1 | 4/2002 | Romero | |
| 6,391,812 B1 | 5/2002 | Araki et al. | |
| 6,401,795 B1 | 6/2002 | Cesarano, III et al. | |
| 6,403,001 B1 | 6/2002 | Hayashi | |
| 6,413,286 B1 | 7/2002 | Swei et al. | |
| 6,451,076 B1 | 9/2002 | Nevoret et al. | |
| 6,475,253 B2 | 11/2002 | Culler et al. | |
| 6,524,681 B1 | 2/2003 | Seitz et al. | |
| 6,531,423 B1 | 3/2003 | Schwetz et al. | |
| 6,537,140 B1 | 3/2003 | Miller et al. | |
| 6,579,819 B2 | 6/2003 | Hirosaki et al. | |
| 6,582,623 B1 | 6/2003 | Grumbine et al. | |
| 6,583,080 B1 | 6/2003 | Rosenflanz | |
| 6,599,177 B2 | 7/2003 | Nevoret et al. | |
| 6,646,019 B2 | 11/2003 | Perez et al. | |
| 6,652,361 B1 | 11/2003 | Gash et al. | |
| 6,669,745 B2 | 12/2003 | Prichard et al. | |
| 6,685,755 B2 | 2/2004 | Ramanath et al. | |
| 6,696,258 B1 | 2/2004 | Wei | |
| 6,702,650 B2 | 3/2004 | Adefris | |
| 6,737,378 B2 | 5/2004 | Hirosaki et al. | |
| 6,749,496 B2 | 6/2004 | Mota et al. | |
| 6,755,729 B2 | 6/2004 | Ramanath et al. | |
| 6,833,014 B2 | 12/2004 | Welygan et al. | |
| 6,843,815 B1 | 1/2005 | Thurber et al. | |
| 6,846,795 B2 | 1/2005 | Lant et al. | |

(56) References Cited

U.S. PATENT DOCUMENTS

| | | |
|---|---|---|
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Armen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 9,074,119 B2 * | 7/2015 | Panzarella ............ C09K 3/1409 |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1* | 6/2005 | Duescher ............... B24D 11/00 451/527 |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1* | 6/2010 | Culler ................... B24D 11/00 428/142 |
| 2010/0151196 A1 | 6/2010 | Adefris et al. |
| 2010/0151201 A1* | 6/2010 | Erickson ............... C09K 3/1409 428/148 |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1* | 6/2011 | Welygan ................ B41M 1/12 101/129 |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0055098 A1 | 3/2012 | Ramanath et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |

(56) References Cited

U.S. PATENT DOCUMENTS

| | | | |
|---|---|---|---|
| 2012/0167481 A1* | 7/2012 | Yener | C09K 3/1409 51/308 |
| 2012/0168979 A1 | 7/2012 | Bauer et al. | |
| 2012/0227333 A1 | 9/2012 | Adefris et al. | |
| 2012/0231711 A1* | 9/2012 | Keipert | C09K 3/1409 451/534 |
| 2012/0308837 A1 | 12/2012 | Schlechtriemen et al. | |
| 2013/0000212 A1 | 1/2013 | Wang et al. | |
| 2013/0000216 A1 | 1/2013 | Wang et al. | |
| 2013/0009484 A1 | 1/2013 | Yu | |
| 2013/0036402 A1 | 2/2013 | Mutisya et al. | |
| 2013/0045251 A1 | 2/2013 | Cen et al. | |
| 2013/0067669 A1 | 3/2013 | Gonzales et al. | |
| 2013/0072417 A1 | 3/2013 | Perez-Prat et al. | |
| 2013/0074418 A1 | 3/2013 | Panzarella et al. | |
| 2013/0125477 A1 | 5/2013 | Adefris | |
| 2013/0180180 A1 | 7/2013 | Yener et al. | |
| 2013/0186005 A1 | 7/2013 | Kavanaugh | |
| 2013/0186006 A1 | 7/2013 | Kavanaugh et al. | |
| 2013/0199105 A1 | 8/2013 | Braun et al. | |
| 2013/0236725 A1 | 9/2013 | Yener et al. | |
| 2013/0255162 A1 | 10/2013 | Welygan et al. | |
| 2013/0263525 A1 | 10/2013 | Erickson | |
| 2013/0267150 A1 | 10/2013 | Seider et al. | |
| 2013/0283705 A1 | 10/2013 | Fischer et al. | |
| 2013/0305614 A1 | 11/2013 | Gaeta et al. | |
| 2013/0337262 A1 | 12/2013 | Bauer et al. | |
| 2013/0337725 A1 | 12/2013 | Monroe | |
| 2014/0000176 A1 | 1/2014 | Moren et al. | |
| 2014/0007518 A1 | 1/2014 | Yener et al. | |
| 2014/0080393 A1 | 3/2014 | Ludwig | |
| 2014/0106126 A1 | 4/2014 | Gaeta et al. | |
| 2014/0182216 A1 | 7/2014 | Panzarella et al. | |
| 2014/0182217 A1 | 7/2014 | Yener et al. | |
| 2014/0186585 A1 | 7/2014 | Field, III et al. | |
| 2014/0250797 A1 | 9/2014 | Yener et al. | |
| 2014/0287658 A1* | 9/2014 | Flaschberger | B24D 3/14 451/47 |
| 2014/0290147 A1 | 10/2014 | Seth et al. | |
| 2014/0352721 A1 | 12/2014 | Gonzales et al. | |
| 2014/0352722 A1 | 12/2014 | Gonzales et al. | |
| 2014/0357544 A1 | 12/2014 | Gonzales et al. | |
| 2014/0378036 A1 | 12/2014 | Cichowlas et al. | |
| 2015/0000209 A1 | 1/2015 | Louapre et al. | |
| 2015/0000210 A1 | 1/2015 | Breder et al. | |
| 2015/0007399 A1 | 1/2015 | Gonzales et al. | |
| 2015/0007400 A1 | 1/2015 | Gonzales et al. | |
| 2015/0089881 A1 | 4/2015 | Stevenson et al. | |
| 2015/0126098 A1 | 5/2015 | Eilers et al. | |
| 2015/0128505 A1 | 5/2015 | Wang et al. | |
| 2015/0183089 A1 | 7/2015 | Iyengar et al. | |
| 2015/0218430 A1 | 8/2015 | Yener et al. | |
| 2015/0232727 A1 | 8/2015 | Erickson | |
| 2015/0291865 A1 | 10/2015 | Breder et al. | |
| 2015/0291866 A1 | 10/2015 | Arcona et al. | |
| 2015/0291867 A1 | 10/2015 | Breder et al. | |
| 2015/0343603 A1 | 12/2015 | Breder et al. | |
| 2016/0177152 A1 | 6/2016 | Braun | |
| 2016/0177153 A1 | 6/2016 | Josseaux | |
| 2016/0177154 A1 | 6/2016 | Josseaux et al. | |
| 2016/0186028 A1 | 6/2016 | Louapare et al. | |
| 2016/0214903 A1 | 7/2016 | Humpal et al. | |
| 2016/0298013 A1 | 10/2016 | Bock et al. | |
| 2016/0303704 A1 | 10/2016 | Chou et al. | |
| 2016/0303705 A1 | 10/2016 | Chou et al. | |
| 2016/0304760 A1 | 10/2016 | Bock et al. | |
| 2016/0311081 A1 | 10/2016 | Culler et al. | |
| 2016/0311084 A1 | 10/2016 | Culler et al. | |
| 2016/0340564 A1 | 11/2016 | Louapre et al. | |
| 2016/0354898 A1 | 12/2016 | Nienaber et al. | |
| 2016/0362589 A1 | 12/2016 | Bauer et al. | |
| 2017/0066099 A1 | 3/2017 | Nakamura | |
| 2017/0114260 A1 | 4/2017 | Bock et al. | |
| 2017/0129075 A1 | 5/2017 | Thurber et al. | |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |

(56) References Cited

FOREIGN PATENT DOCUMENTS

| | | |
|---|---|---|
| JP | H10315142 A | 12/1998 |
| JP | 2957492 B2 | 10/1999 |
| JP | 2000091280 A | 3/2000 |
| JP | 2000-336344 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 5238725 B2 | 7/2013 |
| JP | 5238726 B2 | 7/2013 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 1997014536 A1 | 4/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 2002097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/196795 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2017/151498 A1 | 9/2017 |

OTHER PUBLICATIONS

3M-Cubitron II Cloth Belt 984F Specification, Jan. 13, 2012.*
"Investigation of Shaped Abrasive Particles vol. 1: Review of U.S. Pat. No. 6,054,093 Apr. 25, 2000" © Apr. 2011, 5 pages.
Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
DuPont, "Kevlar Aramid Pulp", Copyright 2011, DuPont, 1 page.
Wu, J. et al., Friction and Wear Properties of Kevlar Pulp Reinforced Epoxy.

(56) References Cited

OTHER PUBLICATIONS

J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
International Search Report for Application No. PCT/US2015/03330, dated Sep. 8, 2015, 1 page.

\* cited by examiner

METHOD OF USING AN ABRASIVE ARTICLE INCLUDING SHAPED ABRASIVE PARTICLES

CROSS-REFERENCE TO RELATED APPLICATION(S)

This application claims priority under 35 U.S.C. § 119(e) to U.S. Patent Application No. 62/005,642 entitled "METHOD OF USING AN ABRASIVE ARTICLE INCLUDING SHAPED ABRASIVE PARTICLES," by Kristin BREDER, Sujatha IYENGAR, and Christopher ARCONA, filed May 30, 2014, which is assigned to the current assignee hereof and incorporated herein by reference in its entirety.

BACKGROUND

Field of the Disclosure

The following is directed to abrasive articles, and particularly, methods of using abrasive articles including shaped abrasive particles.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916, 5,366,523, and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660 (disclosing a process including flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor).

In the sintering process, abrasive particles can be formed from refractory powders having a particle size of up to 10 micrometers in diameter. Binders can be added to the powders along with a lubricant and a suitable solvent, e.g., water. The resulting mixture, mixtures, or slurries can be shaped into platelets or rods of various lengths and diameters. See, for example, U.S. Pat. No. 3,079,242 (disclosing a method of making abrasive particles from calcined bauxite material including (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size).

Chemical ceramic technology involves converting a colloidal dispersion or hydrosol (sometimes called a sol), optionally in a mixture, with solutions of other metal oxide precursors, into a gel or any other physical state that restrains the mobility of the components, drying, and firing to obtain a ceramic material. See, for example, U.S. Pat. Nos. 4,744,802 and 4,848,041.

Still, there remains a need in the industry for improving performance, life, and efficacy of abrasive particles, and the abrasive articles that employ abrasive particles.

SUMMARY

According to one aspect, a method of removing material from one or more workpieces includes moving a coated abrasive article comprising a plurality of shaped abrasive particles relative to a surface of the one or more workpieces at an average material removal rate of at least 6 in$^3$/min/in.

In another aspect, a method of conducting a high-speed, high-efficiency grinding operation including removing material from one or more workpieces by moving a coated abrasive article comprising a plurality of shaped abrasive particles relative to a surface of the one or more workpieces at an average material removal rate within a range between at least 6 in$^3$/min/in and not greater than about 25 in$^3$/min/in and maintaining a substantially constant G-ratio over the range of average material removal rate.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to abrasive articles including, for example, fixed abrasive articles such as coated abrasive articles that may include shaped abrasive particles. More particularly, the following is directed to a method of using a fixed abrasive article including shaped abrasive particles for conducting material removal operations on various workpieces, including but not limited to organic materials and inorganic materials, such as metals, metal alloys (e.g., steel, nickel alloys, etc.), and the like. Certain aspects of the embodiments herein are directed to grinding performance characteristics of abrasive articles, and such characteristics are not to be interpreted as limiting with respect to the range of potential applications of the abrasive articles.

Shaped Abrasive Particles

Various methods may be utilized to obtain shaped abrasive particles. The particles may be obtained from a commercial source or fabricated. Various suitable processes may be used to fabricate the shaped abrasive particles including, but not limited to, screen-printing, molding, pressing, casting, sectioning, cutting, dicing, punching, drying, curing, depositing, coating, extruding, rolling, and a combination thereof. Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

Figure 1A:
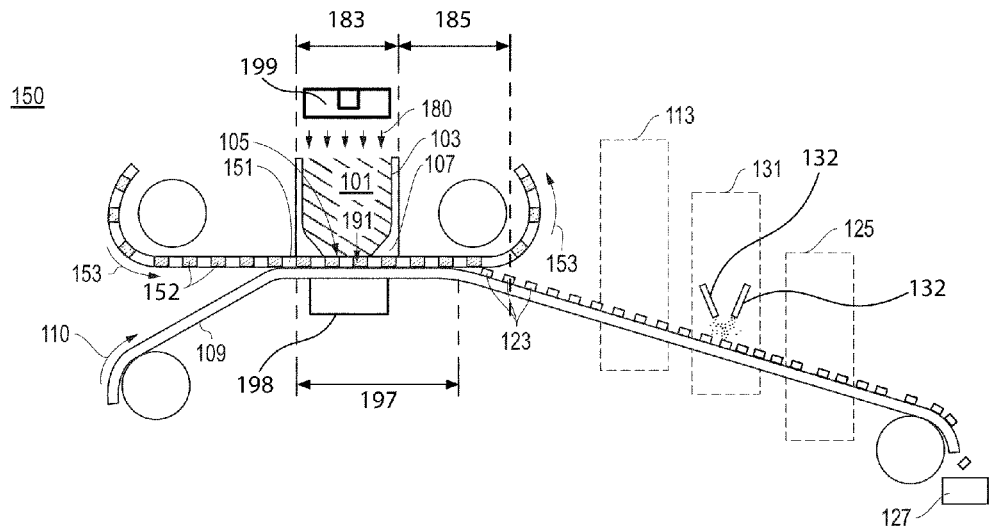
FIG. 1A includes a portion of a system for forming a particulate material in accordance with an embodiment.

FIG. 1A includes an illustration of a system 150 for forming a shaped abrasive particle in accordance with one, non-limiting embodiment. The process of forming shaped abrasive particles can be initiated by forming a mixture 101 including a ceramic material and a liquid. In particular, the mixture 101 can be a gel formed of a ceramic powder material and a liquid, wherein the gel can be characterized as a shape-stable material having the ability to substantially hold a given shape even in the green (i.e., unfired) state. In accordance with an embodiment, the gel can be formed of the ceramic powder material as an integrated network of discrete particles.

The mixture 101 may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object.

The mixture 101 can be formed to have a particular content of solid material, such as the ceramic powder material. For example, in one embodiment, the mixture 101 can have a solids content of at least about 25 wt %, such as at least about 35 wt %, or even at least about 38 wt % for the total weight of the mixture 101. Still, in at least one non-limiting embodiment, the solids content of the mixture 101 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 101 can be formed to have a particular content of liquid material. Some suitable liquids may include water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^7$ Pa, such as not greater than about $2 \times 10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or at least about $65 \times 10^3$ Pa s. In at least one non-limiting embodiment, the mixture 101 may have a viscosity of not greater than about $100 \times 10^3$ Pa s, such as not greater than about $95 \times 10^3$ Pa s, not greater than about $90 \times 10^3$ Pa s, or even not greater than about $85 \times 10^3$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 101 that can be distinct from slurries used in conventional forming operations. For example, the content of organic materials within the mixture 101 and, in particular, any of the organic additives noted above, may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.01 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 101 can have a pH of less than about 5, and more particularly, can have a pH within a range between about 2 and about 4.

The system 150 of FIG. 1A, can include a die 103. As illustrated, the mixture 101 can be provided within the interior of the die 103 and configured to be extruded through a die opening 105 positioned at one end of the die 103. As further illustrated, extruding can include applying a force 180 (such as a pressure) on the mixture 101 to facilitate extruding the mixture 101 through the die opening 105. In an embodiment, the system 150 can generally be referred to as a screen printing process. During extrusion within an application zone 183, a screen 151 can be in direct contact with a portion of a belt 109. The screen printing process can include extruding the mixture 101 from the die 103 through the die opening 105 in a direction 191. In particular, the screen printing process may utilize the screen 151 such that, upon extruding the mixture 101 through the die opening 105, the mixture 101 can be forced into an opening 152 in the screen 151.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 101 and across the width of the die 103 can facilitate improved processing control and improved dimensional characteristics of the shaped abrasive particles.

Figure 1B:
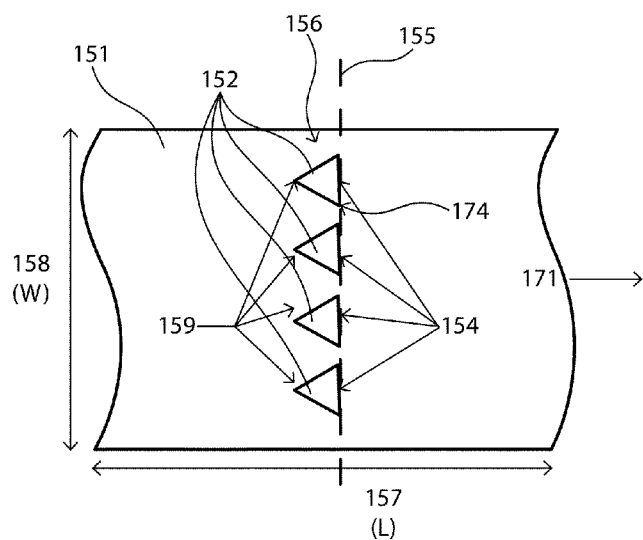
FIG. 1B includes a portion of the system of FIG. 1A for forming a particulate material in accordance with an embodiment.

Referring briefly to FIG. 1B, a portion of the screen 151 is illustrated. As shown, the screen 151 can include the opening 152, and more particularly, a plurality of openings 152 extending through the volume of the screen 151. In accordance with an embodiment, the openings 152 can have a two-dimensional shape as viewed in a plane defined by the length (l) and width (w) of the screen. The two-dimensional shape can include various shapes such as, for example, polygons, ellipsoids, numerals, Greek alphabet letters, Latin alphabet letters, Russian alphabet characters, complex shapes including a combination of polygonal shapes, and a combination thereof. In particular instances, the openings 152 may have two-dimensional polygonal shapes such as a triangle, a rectangle, a quadrilateral, a pentagon, a hexagon, a heptagon, an octagon, a nonagon, a decagon, and a combination thereof.

As further illustrated, the screen 151 can have openings 152 that are oriented in a particular manner relative to each other. As illustrated and in accordance with one embodiment, each of the openings 152 can have substantially the same orientation relative to each other, and substantially the same orientation relative to the surface of the screen. For example, each of the openings 152 can have a first edge 154 defining a first plane 155 for a first row 156 of the openings 152 extending laterally across a lateral axis 158 of the screen 151. The first plane 155 can extend in a direction substantially orthogonal to a longitudinal axis 157 of the screen 151. However, it will be appreciated, that in other instances, the openings 152 need not necessarily have the same orientation relative to each other.

Moreover, the first row 156 of openings 152 can be oriented relative to a direction of translation to facilitate particular processing and controlled formation of shaped abrasive particles. For example, the openings 152 can be arranged on the screen 151 such that the first plane 155 of the first row 156 defines an angle relative to the direction of translation 171. As illustrated, the first plane 155 can define an angle that is substantially orthogonal to the direction of translation 171. Still, it will be appreciated that in one embodiment, the openings 152 can be arranged on the screen 151 such that the first plane 155 of the first row 156 defines a different angle with respect to the direction of translation, including for example, an acute angle or an obtuse angle. Still, it will be appreciated that the openings 152 may not necessarily be arranged in rows. The openings 152 may be arranged in various particular ordered distributions with respect to each other on the screen 151, such as in the form of a two-dimensional pattern. Alternatively, the openings may be disposed in a random manner on the screen 151.

Referring again to FIG. 1A, after forcing the mixture 101 through the die opening 105 and a portion of the mixture 101 through the openings 152 in the screen 151, one or more precursor shaped abrasive particles 123 may be printed on the belt 109 disposed under the screen 151. According to a particular embodiment, the precursor shaped abrasive particles 123 can have a shape substantially replicating the shape of the openings 152. Notably, the mixture 101 can be forced through the screen in rapid fashion, such that the average residence time of the mixture 101 within the openings 152 can be less than about 2 minutes, less than about 1 minute, less than about 40 seconds, or even less than about 20 seconds. In particular non-limiting embodiments, the mixture 101 may be substantially unaltered during printing as it travels through the screen openings 152, thus experiencing no change in the amount of components from the original mixture, and may experience no appreciable drying in the openings 152 of the screen 151.

Additionally, the system 151 can include a bottom stage 198 within the application zone 183. During the process of forming shaped abrasive particles, the belt 109 can travel over the bottom stage 198, which can offer a suitable substrate for forming. According to one embodiment, the bottom stage 198 can include a particularly rigid construction including, for example, an inorganic material such as a metal or metal alloy having a construction suited to facilitating the formation of shaped abrasive particles according to embodiments herein. Moreover, the bottom stage 198 can have an upper surface that is in direct contact with the belt 109 and that has a particular geometry and/or dimension (e.g., flatness, surface roughness, etc.), which can also facilitate improved control of dimensional characteristics of the shaped abrasive particles.

During operation of the system 150, the screen 151 can be translated in a direction 153 while the belt 109 can be translated in a direction 110 substantially similar to the direction 153, at least within the application zone 183, to facilitate a continuous printing operation. As such, the precursor shaped abrasive particles 123 may be printed onto the belt 109 and translated along the belt 109 to undergo further processing. It will be appreciated that such further processing can include processes described in the embodiments herein, including for example, shaping, application of other materials (e.g., dopant material), drying, and the like.

In some embodiments, the belt 109 and/or the screen 151 can be translated while extruding the mixture 101 through the die opening 105. As illustrated in the system 100, the mixture 101 may be extruded in a direction 191. The direction of translation 110 of the belt 109 and/or the screen 151 can be angled relative to the direction of extrusion 191 of the mixture 101. While the angle between the direction of translation 110 and the direction of extrusion 191 is illustrated as substantially orthogonal in the system 100, other angles are contemplated, including for example, an acute angle or an obtuse angle.

The belt 109 and/or the screen 151 may be translated at a particular rate to facilitate processing. For example, the belt 109 and/or the screen 151 may be translated at a rate of at least about 3 cm/s. In other embodiments, the rate of translation of the belt 109 and/or the screen 151 may be greater, such as at least about 4 cm/s, at least about 6 cm/s, at least about 8 cm/s, or even at least about 10 cm/s. Still, in at least one non-limiting embodiment, the belt 109 and/or the screen 151 may be translated in a direction 110 at a rate of not greater than about 5 m/s, not greater than about 1 m/s, or even not greater than about 0.5 m/s. It will be appreciated that the belt 109 and/or the screen 151 may be translated at a rate within a range between any of the minimum and maximum values noted above, and moreover, may be translated at substantially the same rate relative to each other. Furthermore, for certain processes according to embodiments herein, the rate of translation of the belt 109 as compared to the rate of extrusion of the mixture 101 in the direction 191 may be controlled to facilitate proper processing.

After the mixture 101 is extruded through the die opening 105, the mixture 101 may be translated along the belt 109 under a knife edge 107 attached to a surface of the die 103. The knife edge 107 may define a region at the front of the die 103 that facilitates displacement of the mixture 101 into the openings 152 of the screen 151.

Certain processing parameters may be controlled to facilitate formation of particular features of the precursor shaped abrasive particles 123 and the finally-formed shaped abrasive particles described herein. Some exemplary process parameters that can be controlled include a release distance 197, a viscosity of the mixture, a storage modulus of the mixture, mechanical properties of the bottom stage, geometric or dimensional characteristics of the bottom stage, thickness of the screen, rigidity of the screen, a solid content of the mixture, a carrier content of the mixture, a release angle, a translation speed, a temperature, a content of release agent, a pressure exerted on the mixture, a speed of the belt, and a combination thereof.

According to one embodiment, one particular process parameter can include controlling the release distance 197 between a filling position and a release position. In particular, the release distance 197 can be a distance measured in a direction 110 of the translation of the belt 109 between the end of the die 103 and the initial point of separation between the screen 151 and the belt 109. According to one embodiment, controlling the release distance 197 can affect at least one dimensional characteristic of the precursor shaped abrasive particles 123 or the finally-formed shaped abrasive particles. Moreover, control of the release distance 197 can affect a combination of dimensional characteristics of the shaped abrasive particles, including but not limited to, length, width, interior height (hi), variation of interior height (Vhi), difference in height, profile ratio, flashing index, dishing index, rake angle, any of the dimensional characteristic variations of the embodiments herein, and a combination thereof.

According to one embodiment, the release distance 197 can be not greater than a length of the screen 151. In other instances, the release distance 197 can be not greater than a width of the screen 151. Still, in one particular embodiment, the release distance 197 can be not greater than 10 times a largest dimension of the opening 152 in the screen 151. For example, the openings 152 can have a triangular shape, such as illustrated in FIG. 1B, and the release distance 197 can be not greater than 10 times the length of one side of the opening 152 defining the triangular shape. In other instances, the release distance 197 can be less, such as not greater than about 8 times the largest dimension of the opening 152 in the screen 151, such as not greater than about 5 times, not greater than about 3 times, not greater than about 2 times, or even not greater than the largest dimension of the opening 152 in the screen 151.

In more particular instances, the release distance 197 can be not greater than about 30 mm, such as not greater than about 20 mm, or even not greater than about 10 mm. For at least one embodiment, the release distance can be substantially zero, and more particularly, can be essentially zero. Accordingly, the mixture 101 can be disposed into the openings 152 within the application zone 183 and the screen 151 and the belt 109 may be separating from each other at the end of the die 103 or even before the end of the die 103.

According to one particular method of forming, the release distance 197 can be essentially zero, which may facilitate substantially simultaneous filling of the openings 152 with the mixture 101 and separation between the belt 109 and the screen 151. For example, before the screen 151 and the belt 109 pass the end of the die 103 and exit the application zone 183, separation of the screen 151 and the belt 109 may be initiated. In more particular embodiments, separation between the screen 151 and the belt 109 may be initiated immediately after the openings 152 are filled with the mixture 101, prior to leaving the application zone 183 and while the screen 151 is located under the die 103. In still another embodiment, separation between the screen 151 and the belt 109 may be initiated while the mixture 101 is being placed within the opening 152 of the screen 151. In an alternative embodiment, separation between the screen 151 and the belt 109 can be initiated before the mixture 101 is placed in the openings 152 of the screen 151. For example, before the openings 152 pass under the die opening 105, the belt 109 and screen 151 are being separated, such that a gap exists between belt 109 and the screen 151 while the mixture 101 is being forced into the openings 152.

Figure 2:
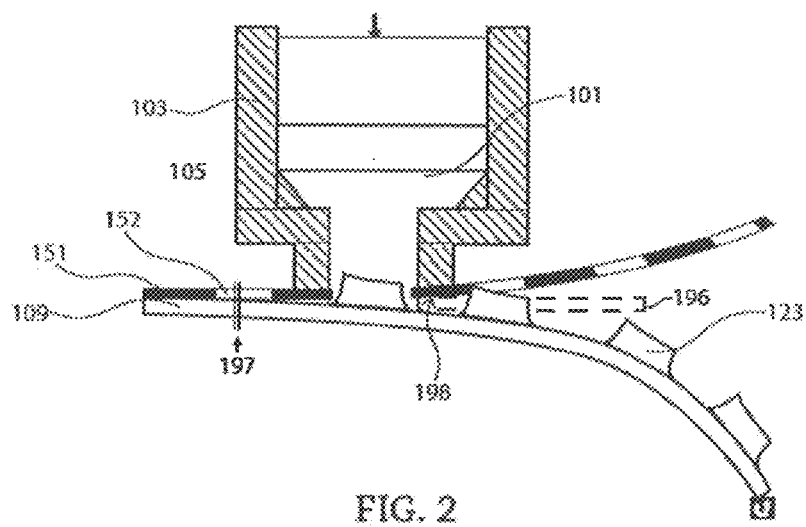
FIG. 2 includes a portion of a system for forming a particulate material in accordance with an embodiment.

For example, FIG. 2 illustrates a printing operation where the release distance 197 is substantially zero and separation between the belt 109 and the screen 151 is initiated before the belt 109 and screen 151 pass under the die opening 105. More particularly, the release between the belt 109 and the screen 151 is initiated as the belt 109 and screen 151 enter the application zone 183 and pass under the front of the die 103. Still, it will be appreciated that in some embodiments, separation of the belt 109 and screen 151 can occur before the belt 109 and screen 151 enter the application zone 183 (defined by the front of the die 103), such that the release distance 197 may be a negative value.

Control of the release distance 197 can facilitate controlled formation of shaped abrasive particles having improved dimensional characteristics and improved dimensional tolerances (e.g., low dimensional characteristic variability). For example, decreasing the release distance 197 in combination with controlling other processing parameters can facilitate improved formation of shaped abrasive particles having greater interior height (hi) values.

Additionally, as illustrated in FIG. 2, control of the separation height 196 between a surface of the belt 109 and a lower surface 198 of the screen 151 may facilitate controlled formation of shaped abrasive particles having improved dimensional characteristics and improved dimensional tolerances (e.g., low dimensional characteristic variability). The separation height 196 may be related to the thickness of the screen 151, the distance between the belt 109 and the die 103, and a combination thereof. Moreover, one or more dimensional characteristics (e.g., interior height) of the precursor shaped abrasive particles 123 may be controlled by controlling the separation height 196 and the thickness of the screen 151. In particular instances, the screen 151 can have an average thickness of not greater than about 700 microns, such as not greater than about 690 microns, not greater than about 680 microns, not greater than about 670 microns, not greater than about 650 microns, or not greater than about 640 microns. Still, the average thickness of the screen can be at least about 100 microns, such as at least about 300 microns, or even at least about 400 microns.

In one embodiment the process of controlling can include a multi-step process that can include measuring, calculating, adjusting, and a combination thereof. Such processes can be applied to the process parameter, a dimensional characteristic, a combination of dimensional characteristics, and a combination thereof. For example, in one embodiment, controlling can include measuring one or more dimensional characteristics, calculating one or more values based on the process of measuring the one or more dimensional characteristics, and adjusting one or more process parameters (e.g., the release distance 197) based on the one or more calculated values. The process of controlling, and particularly any of the processes of measuring, calculating, and adjusting may be completed before, after, or during the formation of the shaped abrasive particles. In one particular embodiment, the controlling process can be a continuous process, wherein one or more dimensional characteristics are measured and one or more process parameters are changed (i.e., adjusted) in response to the measured dimensional characteristics. For example, the process of controlling can include measuring a dimensional characteristic such as a difference in height of the precursor shaped abrasive particles 123, calculating a difference in height value of the precursor shaped abrasive particles 123, and changing the release distance 197 to change the difference in height value of the precursor shaped abrasive particles 123.

Referring again to FIG. 1, after extruding the mixture 101 into the openings 152 of the screen 151, the belt 109 and the screen 151 may be translated to a release zone 185 where the belt 109 and the screen 151 can be separated to facilitate the formation of the precursor shaped abrasive particles 123. In accordance with an embodiment, the screen 151 and the belt 109 may be separated from each other within the release zone 185 at a particular release angle.

In fact, as illustrated, the precursor shaped abrasive particles 123 may be translated through a series of zones wherein various treating processes may be conducted. Some suitable exemplary treating processes can include drying, heating, curing, reacting, radiating, mixing, stirring, agitating, planarizing, calcining, sintering, comminuting, sieving, doping, and a combination thereof. According to one embodiment, the precursor shaped abrasive particles 123 may be translated through an optional shaping zone 113, wherein at least one exterior surface of the particles may be shaped as described in embodiments herein. Furthermore, the precursor shaped abrasive particles 123 may be translated through an optional application zone 131, wherein a dopant material can be applied to at least one exterior surface of the particles as described in embodiments herein. And further, the precursor shaped abrasive particles 123 may be translated on the belt 109 through an optional post-forming zone 125, wherein a variety of processes, including for example, drying, may be conducted on the precursor shaped abrasive particles 123 as described in embodiments herein.

The application zone 131 may be used for applying a material to at least one exterior surface of one or more precursor shaped abrasive particles 123. In accordance with an embodiment, a dopant material may be applied to the precursor shaped abrasive particles 123. More particularly, as illustrated in FIG. 1, the application zone 131 can be positioned before the post-forming zone 125. As such, the process of applying a dopant material may be completed on the precursor shaped abrasive particles 123. However, it will be appreciated that the application zone 131 may be positioned in other places within the system 100. For example, the process of applying a dopant material can be completed after forming the precursor shaped abrasive particles 123, and more particularly, after the post-forming zone 125. In yet other instances, which will be described in more detail herein, the process of applying a dopant material may be conducted simultaneously with a process of forming the precursor shaped abrasive particles 123.

Within the application zone 131, a dopant material may be applied utilizing various methods including for example, spraying, dipping, depositing, impregnating, transferring, punching, cutting, pressing, crushing, and any combination thereof. In particular instances, the application zone 131 may utilize a spray nozzle, or a combination of spray nozzles 132 and 133 to spray dopant material onto the precursor shaped abrasive particles 123.

In accordance with an embodiment, applying a dopant material can include the application of a particular material, such as a precursor. In certain instances, the precursor can be a salt, such as a metal salt, that includes a dopant material to be incorporated into the finally-formed shaped abrasive particles. For example, the metal salt can include an element or compound that is the precursor to the dopant material. It will be appreciated that the salt material may be in liquid form, such as in a dispersion comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

In particular instances, the process of applying a dopant material can include selective placement of the dopant material on at least one exterior surface of a precursor shaped abrasive particle 123. For example, the process of applying a dopant material can include the application of a dopant material to an upper surface or a bottom surface of the precursor shaped abrasive particles 123. In still another embodiment, one or more side surfaces of the precursor shaped abrasive particles 123 can be treated such that a dopant material is applied thereto. It will be appreciated that various methods may be used to apply the dopant material to various exterior surfaces of the precursor shaped abrasive particles 123. For example, a spraying process may be used to apply a dopant material to an upper surface or side surface of the precursor shaped abrasive particles 123. Still, in an alternative embodiment, a dopant material may be applied to the bottom surface of the precursor shaped abrasive particles 123 through a process such as dipping, depositing, impregnating, or a combination thereof. It will be appreciated that a surface of the belt 109 may be treated with dopant material to facilitate a transfer of the dopant material to a bottom surface of precursor shaped abrasive particles 123.

After forming precursor shaped abrasive particles 123, the particles may be translated through a post-forming zone 125. Various processes may be conducted in the post-forming zone 125, including treatment of the precursor shaped abrasive particles 123. In one embodiment, the post-forming zone 125 can include a heating process where the precursor shaped abrasive particles 123 may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above. Furthermore, the precursor shaped abrasive particles 123 may be translated through the post-forming zone 125 at a particular rate, such as at least about 0.2 feet/min and not greater than about 8 feet/min.

Furthermore, the drying process may be conducted for a particular duration. For example, the drying process may be not greater than about six hours.

After the precursor shaped abrasive particles 123 are translated through the post-forming zone 125, the precursor shaped abrasive particles 123 may be removed from the belt 109. The precursor shaped abrasive particles 123 may be collected in a bin 127 for further processing.

In accordance with an embodiment, the process of forming shaped abrasive particles may further comprise a sintering process. For certain processes of embodiments herein, sintering can be conducted after collecting the precursor shaped abrasive particles 123 from the belt 109. Alternatively, the sintering may be a process that is conducted while the precursor shaped abrasive particles 123 are on the belt 109. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina, is formed. In one instance, a shaped abrasive particle can comprise at least about 90 wt % alpha alumina for the total weight of the particle. In other instances, the content of alpha alumina may be greater such that the shaped abrasive particle may consist essentially of alpha alumina.

Additionally, the body of the finally-formed shaped abrasive particles can have particular two-dimensional shapes. For example, the body can have a two-dimensional shape, as viewed in a plane defined by the length and width of the body, and can have a shape including a polygonal shape, ellipsoidal shape, a numeral, a Greek alphabet character, a Latin alphabet character, a Russian alphabet character, a complex shape utilizing a combination of polygonal shapes and a combination thereof. Particular polygonal shapes include triangular, rectangular, trapezoidal, pentagonal, hexagonal, heptagonal, octagonal, nonagonal, decagonal, and any combination thereof. In another embodiment, the body can include a two-dimensional shape, as viewed in a plane defined by a length and a width of the body, including shapes selected from the group consisting of ellipsoids, Greek alphabet characters, Latin alphabet characters, Russian alphabet characters, and a combination thereof.

Figure 3A:
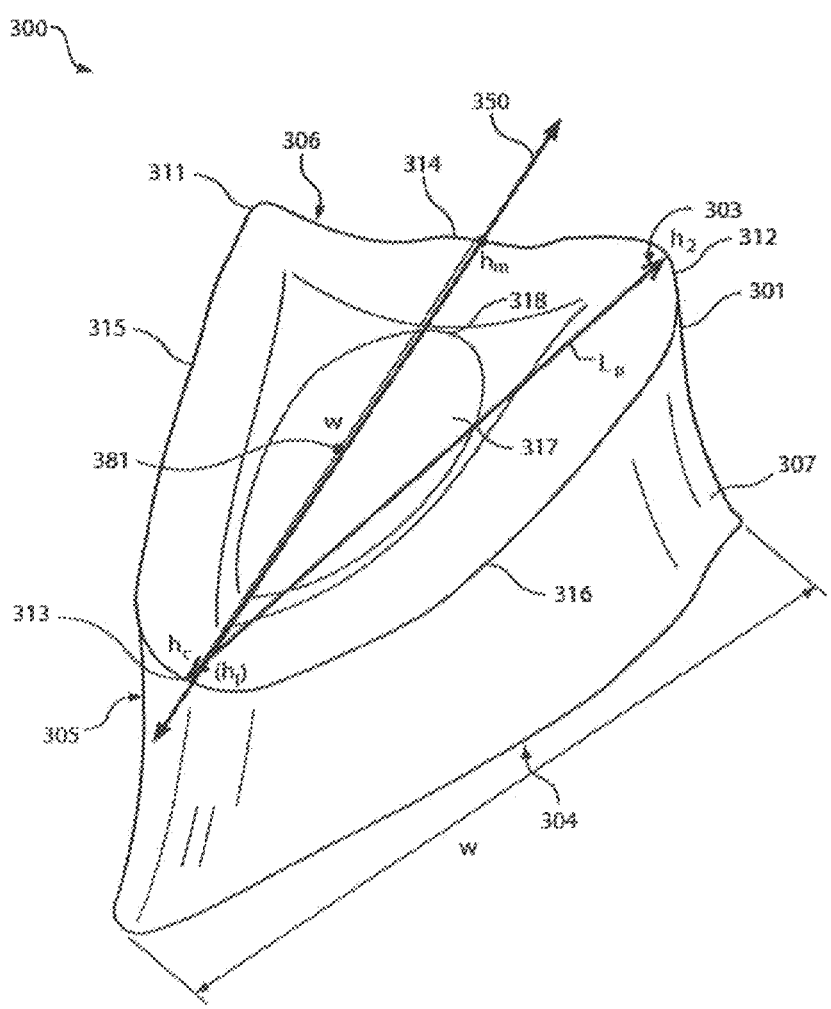
FIG. 3A includes a perspective view illustration of a shaped abrasive particle according to an embodiment FIG. 3B includes a cross-sectional illustration of the shaped abrasive particle of FIG. 3A.
Figure 3B:
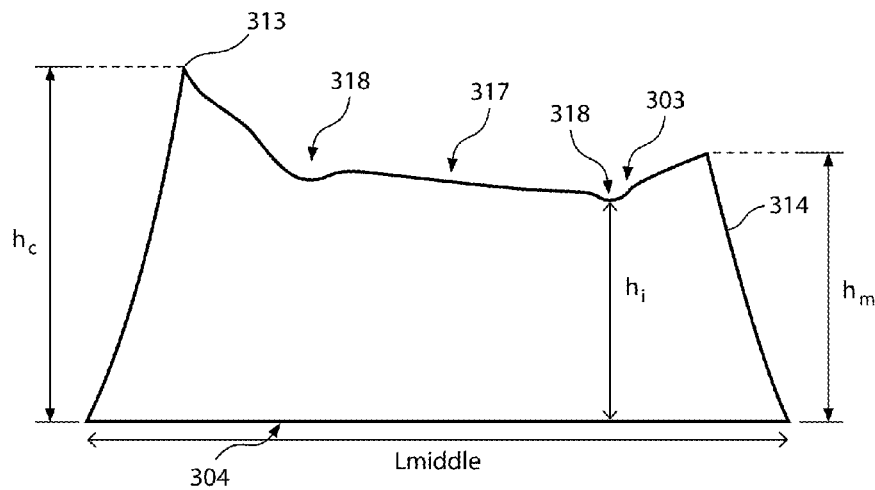

FIG. 3A includes a perspective view illustration of a shaped abrasive particle 300 in accordance with an embodiment. Additionally, FIG. 3B includes a cross-sectional illustration of the abrasive particle of FIG. 3A. A body 301 of the shaped abrasive particle 300 includes an upper major surface 303 (i.e., a first major surface) and a bottom major surface 304 (i.e., a second major surface) opposite the upper major surface 303. The upper surface 303 and the bottom surface 304 can be separated from each other by side surfaces 305, 306, and 307. As illustrated, the body 301 of the shaped abrasive particle 300 can have a generally triangular shape as viewed in a plane of the upper surface 303. In particular, the body 301 can have a length (Lmiddle) as shown in FIG. 3B, which may be measured at the bottom surface 304 of the body 301 as extending from a corner 313 through a midpoint 381 of the body 301 to a midpoint at the opposite edge 314 of the body. Alternatively, the body 301 can be defined by a second length or profile length (Lp), which is the measure of the dimension of the body 301 from a side view at the upper surface 303 from a first corner 313 to an adjacent corner 312. Notably, the dimension of Lmiddle can be a length defining a distance between a height at a corner (hc) and a height at a midpoint edge (hm) opposite the corner. The dimension Lp can be a profile length along a side of the particle 300 (as seen from a side view such as shown in FIGS. 2A and 2B) defining the distance between h1 and h2. Reference herein to the length can refer to either Lmiddle or Lp.

The body 301 can further include a width (w) that is the longest dimension of the body 301 and extending along a side. The body 301 can further include a height (h), which may be a dimension of the body 301 extending in a direction perpendicular to the length and width in a direction defined by a side surface of the body 301. Notably, as will be described in more detail herein, the body 301 can be defined by various heights depending upon the location on the body 301. In specific instances, the width can be greater than or equal to the length, the length can be greater than or equal to the height, and the width can be greater than or equal to the height.

Moreover, reference herein to any dimensional characteristic (e.g., h1, h2, hi, w, Lmiddle, Lp, and the like) can be reference to a dimension of a single shaped abrasive particle of a batch, a median value, or an average value derived from analysis of a suitable sampling of shaped abrasive particles from a batch. Unless stated explicitly, reference herein to a dimensional characteristic can be considered reference to a median value that is a based on a statistically significant value derived from a sample size of a suitable number of particles from a batch of particles. Notably, for certain embodiments herein, the sample size can include at least 10 randomly selected particles from a batch of particles. A batch of particles may be a group of particles that are collected from a single process run. Additionally or alternatively, a batch of particles may include an amount of shaped abrasive particles suitable for forming a commercial grade abrasive product, such as at least about 20 lbs. of particles.

In accordance with an embodiment, the body 301 of the shaped abrasive particle can have a first corner height (hc) at a first region of the body defined by a corner 313. Notably, the corner 313 may represent the point of greatest height on the body 301, however, the height at the corner 313 does not necessarily represent the point of greatest height on the body 301. The corner 313 can be defined as a point or region on the body 301 defined by the joining of the upper surface 303, and two side surfaces 305 and 307. The body 301 may further include other corners, spaced apart from each other, including for example, corner 311 and corner 312. As further illustrated, the body 301 can include edges 314, 315, and 316 that can be separated from each other by the corners 311, 312, and 313. The edge 314 can be defined by an intersection of the upper surface 303 with the side surface 306. The edge 315 can be defined by an intersection of the upper surface 303 and side surface 305 between corners 311 and 313. The edge 316 can be defined by an intersection of the upper surface 303 and side surface 307 between corners 312 and 313.

As further illustrated, the body 301 can include a second midpoint height (hm) at a second end of the body 301, which can be defined by a region at the midpoint of the edge 314, which can be opposite the first end defined by the corner 313. The axis 350 can extend between the two ends of the body 301. FIG. 3B is a cross-sectional illustration of the body 301 along the axis 350, which can extend through a midpoint 381 of the body 301 along the dimension of length (Lmiddle) between the corner 313 and the midpoint of the edge 314.

In accordance with an embodiment, the shaped abrasive particles of the embodiments herein, including for example, the particle of FIGS. 3A and 3B can have an average difference in height, which is a measure of the difference between hc and hm. For convention herein, average difference in height will be generally identified as hc-hm, however it is defined as an absolute value of the difference. Therefore, it will be appreciated that average difference in height may be calculated as hm-hc when the height of the body 301 at the midpoint of the edge 314 is greater than the height at the corner 313. More particularly, the average difference in height can be calculated based upon a plurality of shaped abrasive particles from a suitable sample size. The heights hc and hm of the particles can be measured using a STIL (Sciences et Techniques Industrielles de la Lumiere—France) Micro Measure 3D Surface Profilometer (white light (LED) chromatic aberration technique) and the average difference in height can be calculated based on the average values of hc and hm from the sample.

As illustrated in FIG. 3B, in one particular embodiment, the body 301 of the shaped abrasive particle 300 may have an average difference in height at different locations at the body 301. The body 301 can have an average difference in height, which can be the absolute value of [hc-hm] between the first corner height (hc) and the second midpoint height (hm) that is at least about 20 microns. It will be appreciated that average difference in height may be calculated as hm-hc when the height of the body 301 at a midpoint of the edge is greater than the height at an opposite corner. In other instances, the average difference in height [hc-hm] can be at least about 25 microns, at least about 30 microns, at least about 36 microns, at least about 40 microns, at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above. Moreover, it will be appreciated that the average difference in height can be based upon an average value of hc. For example, the average height of the body 301 at the corners (Ahc) can be calculated by measuring the height of the body 301 at all corners and averaging the values, and may be distinct from a single value of height at one corner (hc). Accordingly, the average difference in height may be given by the absolute value of the equation [Ahc-hi]. Furthermore, it will be appreciated that the average difference in height can be calculated using a median interior height (Mhi) calculated from a suitable sample size from a batch of shaped abrasive particles and an average height at the corners for all particles in the sample size. Accordingly, the average difference in height may be given by the absolute value of the equation [Ahc-Mhi].

In particular instances, the body 301 can be formed to have a primary aspect ratio, which is a ratio expressed as width:length, having a value of at least 1:1. In other instances, the body 301 can be formed such that the primary aspect ratio (w:l) is at least about 1.5:1, such as at least about 2:1, at least about 4:1, or even at least about 5:1. Still, in other instances, the abrasive particle 300 can be formed such that the body 301 has a primary aspect ratio that is not greater than about 10:1, such as not greater than 9:1, not greater than about 8:1, or even not greater than about 5:1. It will be appreciated that the body 301 can have a primary aspect ratio within a range between any of the ratios noted above. Furthermore, it will be appreciated that reference herein to a height can be reference to the maximum height measurable of the abrasive particle 300. It will be described later that the abrasive particle 300 may have different heights at different positions within the body 301 of the abrasive particle 300.

In addition to the primary aspect ratio, the abrasive particle 300 can be formed such that the body 301 comprises a secondary aspect ratio, which can be defined as a ratio of length:height, wherein the height is an interior median height (Mhi). In certain instances, the secondary aspect ratio can be at least about 1:1, such as at least about 2:1, at least about 4:1, or even at least about 5:1. Still, in other instances, the abrasive particle 300 can be formed such that the body 301 has a secondary aspect ratio that is not greater than about 1:3, such as not greater than 1:2, or even not greater than about 1:1. It will be appreciated that the body 301 can have a secondary aspect ratio within a range between any of the ratios noted above, such as within a range between about 5:1 and about 1:1.

In accordance with another embodiment, the abrasive particle 300 can be formed such that the body 301 comprises a tertiary aspect ratio, defined by the ratio width:height, wherein the height is an interior median height (Mhi). The tertiary aspect ratio of the body 301 can be can be at least about 1:1, such as at least about 2:1, at least about 4:1, at least about 5:1, or even at least about 6:1. Still, in other instances, the abrasive particle 300 can be formed such that the body 301 has a tertiary aspect ratio that is not greater than about 3:1, such as not greater than 2:1, or even not greater than about 1:1. It will be appreciated that the body 301 can have a tertiary aspect ratio within a range between any of the ratios noted above, such as within a range between about 6:1 and about 1:1.

According to one embodiment, the body 301 of the shaped abrasive particle 300 can have particular dimensions, which may facilitate improved performance. For example, in one instance, the body 301 can have an interior height (hi), which can be the smallest dimension of height of the body 301 as measured along a dimension between any corner and opposite midpoint edge on the body 301. In particular instances, wherein the body 301 is a generally triangular two-dimensional shape, the interior height (hi) may be the smallest dimension of height (i.e., measure between the bottom surface 304 and the upper surface 305) of the body 301 for three measurements taken between each of the three corners and the opposite midpoint edges. The interior height (hi) of the body 301 of a shaped abrasive particle 300 is illustrated in FIG. 3B. According to one embodiment, the interior height (hi) can be at least about 20% of the width (w). The height (hi) may be measured by sectioning or mounting and grinding the shaped abrasive particle 300 and viewing in a manner sufficient (e.g., light microscope or SEM) to determine the smallest height (hi) within the interior of the body 301. In one particular embodiment, the height (hi) can be at least about 22% of the width, such as at least about 25%, at least about 30%, or even at least about 33%, of the width of the body 301. For one non-limiting embodiment, the height (hi) of the body 301 can be not greater than about 80% of the width of the body 301, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body 301 can be within a range between any of the above noted minimum and maximum percentages.

A batch of shaped abrasive particles, can be fabricated, wherein the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 20% of the width, such as at least about 22%, at least about 25%, at least about 30%, or even at least about 33% of the median width of the shaped abrasive particles of the batch. For one non-limiting embodiment, the median interior height (Mhi) of the body 301 can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width of the body 301. It will be appreciated that the median interior height (Mhi) of the body 301 can be within a range between any of the above noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above noted minimum and maximum values.

For another embodiment, the body 301 of the shaped abrasive particle 300 can have an interior height (hi) of at least about 400 microns. More particularly, the height may be at least about 450 microns, such as at least about 475 microns, or even at least about 500 microns. In still one non-limiting embodiment, the height of the body 301 can be not greater than about 3 mm, such as not greater than about 2 mm, not greater than about 1.5 mm, not greater than about 1 mm, or even not greater than about 800 microns. It will be appreciated that the height of the body 301 can be within a range between any of the above noted minimum and maximum values. Moreover, it will be appreciated that the above range of values can be representative of a median interior height (Mhi) value for a batch of shaped abrasive particles.

For certain embodiments herein, the body 301 of the shaped abrasive particle 300 can have particular dimensions, including for example, a width≥length, a length≥height, and a width≥height. More particularly, the body 301 of the shaped abrasive particle 300 can have a width (w) of at least about 600 microns, such as at least about 700 microns, at least about 800 microns, or even at least about 900 microns. In one non-limiting instance, the body 301 can have a width of not greater than about 4 mm, such as not greater than about 3 mm, not greater than about 2.5 mm, or even not greater than about 2 mm. It will be appreciated that the width of the body 301 can be within a range between any of the above noted minimum and maximum values. Moreover, it will be appreciated that the above range of values can be representative of a median width (Mw) for a batch of shaped abrasive particles.

The body 301 of the shaped abrasive particle 300 can have particular dimensions, including for example, a length (L middle or Lp) of at least about 0.4 mm, such as at least about 0.6 mm, at least about 0.8 mm, or even at least about 0.9 mm. Still, for at least one non-limiting embodiment, the body 301 can have a length of not greater than about 4 mm, such as not greater than about 3 mm, not greater than about 2.5 mm, or even not greater than about 2 mm. It will be appreciated that the length of the body 301 can be within a range between any of the above noted minimum and maximum values. Moreover, it will be appreciated that the above range of values can be representative of a median length (Ml), which may be more particularly, a median middle length (MLmiddle) or median profile length (MLp) for a batch of shaped abrasive particles.

The shaped abrasive particle 300 can have a body 301 having a particular amount of dishing, wherein the dishing value (d) can be defined as a ratio between an average height of the body 301 at the corners (Ahc) as compared to smallest dimension of height of the body 301 at the interior (hi). The average height of the body 301 at the corners (Ahc) can be calculated by measuring the height of the body 301 at all corners and averaging the values, and may be distinct from a single value of height at one corner (hc). The average height of the body 301 at the corners or at the interior can be measured using a STIL (Sciences et Techniques Industrielles de la Lumiere—France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, not greater than about 1.5, or even not greater than about 1.2. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 301 of the particle of FIG. 3A can have a bottom surface 304 defining a bottom area $(A_b)$. In particular instances, the bottom surface 304 can be the largest surface of the body 301. The bottom major surface 304 can have a surface area defined as the bottom area $(A_b)$ that is different than the surface area of the upper major surface 303. In one particular embodiment, the bottom major surface 304 can have a surface area defined as the bottom area $(A_b)$ that is different than the surface area of the upper major surface 303. In another embodiment, the bottom major surface 304 can have a surface area defined as the bottom area $(A_b)$ that is less than the surface area of the upper major surface 303.

Additionally, the body 301 can have a cross-sectional midpoint area $(A_m)$ defining an area of a plane perpendicular to the bottom area $(A_b)$ and extending through a midpoint 381 of the particle 300. In certain instances, the body 301 can have an area ratio of bottom area to midpoint area $(A_b/A_m)$ of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore the shaped abrasive particles of the embodiments herein including, for example, the particle of FIG. 3B, can have a normalized height difference of not greater than about 0.3. The normalized height difference can be defined by the absolute value of the equation $[(hc-hm)/(hi)]$. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, or even at least about 0.06. It will be appreciated that the normalized height difference can be within a range between any of the minimum and maximum values noted above. Moreover, it will be appreciated that the above normalized height values can be representative of a median normalized height value for a batch of shaped abrasive particles.

In another instance, the body 301 can have a profile ratio of at least about 0.04, wherein the profile ratio is defined as a ratio of the average difference in height [hc-hm] to the length (Lmiddle) of the shaped abrasive particle 300, defined as the absolute value of $[(hc-hm)/(Lmiddle)]$. It will be appreciated that the length (Lmiddle) of the body 301 can be the distance across the body 301 as illustrated in FIG. 3B. Moreover, the length may be an average or median length calculated from a suitable sampling of particles from a batch of shaped abrasive particles as defined herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above. Moreover, it will be appreciated that the above profile ratio can be representative of a median profile ratio for a batch of shaped abrasive particles.

According to another embodiment, the body 301 can have a particular rake angle, which may be defined as an angle between the bottom surface 304 and a side surface 305, 306 or 307 of the body 301. For example, the rake angle may be within a range between about 1° and about 80°. For other particles herein, the rake angle can be within a range between about 5° and 55°, such as between about 10° and about 50°, between about 15° and 50°, or even between about 20° and 50°. Formation of an abrasive particle having such a rake angle can improve the abrading capabilities of the abrasive particle 300. Notably, the rake angle can be within a range between any two rake angles noted above.

According to another embodiment, the shaped abrasive particles herein including, for example, the particles of FIGS. 3A and 3B, can have an ellipsoidal region 317 in the upper surface 303 of the body 301. The ellipsoidal region 317 can be defined by a trench region 318 that can extend around the upper surface 303 and define the ellipsoidal region 317. The ellipsoidal region 317 can encompass the midpoint 381. Moreover, it is thought that the ellipsoidal region 317 defined in the upper surface 303 can be an artifact of the forming process, and may be formed as a result of the stresses imposed on the mixture 101 during formation of the shaped abrasive particles according to the methods described herein.

The shaped abrasive particle 300 can be formed such that the body 301 includes a crystalline material, and more particularly, a polycrystalline material. Notably, the polycrystalline material can include abrasive grains. In one embodiment, the body 301 can be essentially free of an organic material, including for example, a binder. More particularly, the body 301 can consist essentially of a polycrystalline material.

In one aspect, the body 301 of the shaped abrasive particle 300 can be an agglomerate including a plurality of abrasive particles, grit, and/or grains bonded to each other to form the body 301 of the abrasive particle 300. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 300 is formed such that the abrasive grains forming the body 301 include alumina, and more particularly, may consist essentially of alumina. Moreover, in particular instances, the shaped abrasive particle 300 can be formed from a seeded sol-gel.

The abrasive grains (i.e., crystallites) contained within the body 301 may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the abrasive grains contained within the body 301 can be at least about 0.01 microns, such as at least about 0.05 microns, such as at least about 0.08 microns, at least about 0.1 microns, or even at least about 0.5 microns. It will be appreciated that the abrasive grains can have an average grain size within a range between any of the minimum and maximum values noted above.

In accordance with certain embodiments, the abrasive particle 300 can be a composite article including at least two different types of abrasive grains within the body 301. It will be appreciated that different types of abrasive grains are abrasive grains having different compositions with regard to each other. For example, the body 301 can be formed such that is includes at least two different types of abrasive grains, wherein the two different types of abrasive grains can be nitrides, oxides, carbides, borides, oxynitrides, oxyborides, diamond, and a combination thereof.

In accordance with an embodiment, the abrasive particle 300 can have an average particle size, as measured by the largest dimension measurable on the body 301, of at least about 100 microns. In fact, the abrasive particle 300 can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle 300 can have an average particle size that is not greater than about 5 mm, such as not greater than about 3 mm, not greater than about 2 mm, or even not greater than about 1.5 mm. It will be appreciated that the abrasive particle 300 can have an average particle size within a range between any of the minimum and maximum values noted above.

Figure 4:
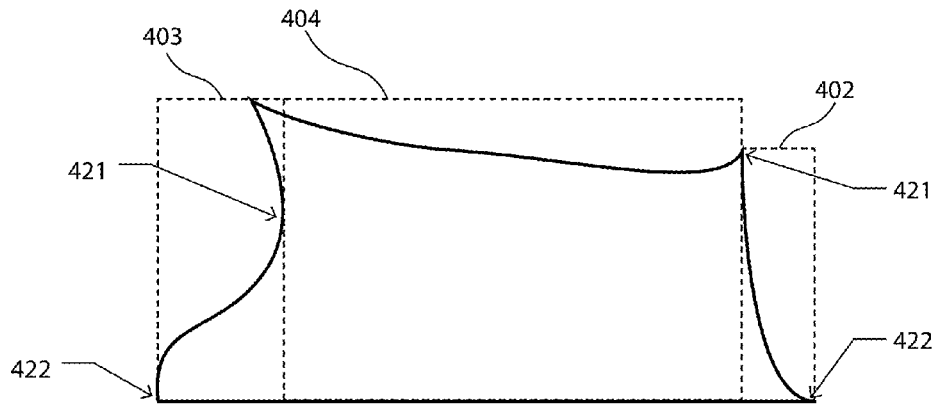
FIG. 4 includes a side view of a shaped abrasive particle and percentage flashing according to an embodiment.

The shaped abrasive particles of the embodiments herein can have a percent flashing that may facilitate improved performance. Notably, the flashing defines an area of the particle as viewed along one side, such as illustrated in FIG. 4, wherein the flashing extends from a side surface of the body 301 within the boxes 402 and 403. The flashing can represent tapered regions proximate to the upper surface 303 and bottom surface 304 of the body 301. In a particular embodiment, the tapered regions can be defined by an arcuate side surface of the body. For example, as illustrated in FIG. 3, the side surface can be at least partially concave, wherein a portion of the side surface is concave and a portion of the side surface is linear. In another example, such as illustrated in FIG. 4, the entire side surface (e.g., side surface in box 402) can be concave. In yet another embodiment, the side surface of the particle can include a concave portion and a convex portion (e.g., side surface in box 403) extending between upper and bottom surfaces 303 and 304 of the body 301. The flashing can be measured as the percentage of area of the body 301 along the side surface contained within a box extending between an innermost point of the side surface (e.g., 421) and an outermost point (e.g., 422) on the side surface of the body 301. In a particular embodiment, the innermost point 421 of the side surface can be spaced apart from the upper surface 303 and the bottom surface 304. More particularly, the innermost point 421 may be disposed at a central, or relatively central, height of the particle. In a particular instance, the flashing can be non-linearly distributed along the height of the particle. That is, the side surface of the particle can taper non-uniformly, such as randomly or exponentially, along the height of the particle. In a particular embodiment, an area of the particle below the innermost point 421 of the side surface may be different than an area of the particle above the innermost point 421. For example, as illustrated for example in FIG. 4, the area below the innermost point 421 may be less than the area above the innermost point 421. Alternatively, the area above the innermost point 421 may be greater than the area above the innermost point 421.

In one particular instance, the body 301 can have a particular content of flashing, which can be the percentage of area of the body 301 contained within the boxes 402 and 403 compared to the total area of the body 301 contained within boxes 402, 403, and 404. According to one embodiment, the percent flashing (f) of the body 301 can be at least about 1%. In another embodiment, the percent flashing can be greater, such as at least about 2%, at least about 3%, at least about 5%, at least about 8%, at least about 10%, at least about 12%, such as at least about 15%, at least about 18%, or even at least about 20%. Still, in a non-limiting embodiment, the percent flashing of the body 301 can be controlled and may be not greater than about 45%, such as not greater than about 40%, not greater than about 35%, not greater than about 30%, not greater than about 25%, not greater than about 20%, not greater than about 18%, not greater than about 15%, not greater than about 12%, not greater than about 10%, not greater than about 8%, not greater than about 6%, or even not greater than about 4%. It will be appreciated that the percent flashing of the body 301 can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle 300 on its side and viewing the body 301 at the side to generate a black and white image, such as illustrated in FIG. 4. A suitable program for such includes ImageJ software. The percentage flashing can be calculated by determining the area of the body 301 in the boxes 402 and 403 compared to the total area of the body 301 as viewed at the side (total shaded area), including the area in the center 404 and within the boxes. Such a procedure can be completed for a suitable sampling of particles to generate average, median, and/or and standard deviation values.

A batch of shaped abrasive particles according to embodiments herein may exhibit improved dimensional uniformity as measured by the standard deviation of a dimensional characteristic from a suitable sample size. According to one embodiment, the shaped abrasive particles can have a flashing variation (Vf), which can be calculated as the standard deviation of flashing percentage (f) for a suitable sample size of particles from a batch. According to one embodiment, the flashing variation can be not greater than about 5.5%, such as not greater than about 5.3%, not greater than about 5%, or not greater than about 4.8%, not greater than about 4.6%, or even not greater than about 4.4%. In one non-limiting embodiment, the flashing variation (Vf) can be at least about 0.1%. It will be appreciated that the flashing variation can be within a range between any of the minimum and maximum percentages noted above.

The shaped abrasive particles of the embodiments herein can have a height (hi) and flashing multiplier value (hiF) of at least 4000, wherein hiF=(hi)(f), an "hi" represents a minimum interior height of the body 301 as described above and "f" represents the percent flashing. In one particular instance, the height and flashing multiplier value (hiF) of the body 301 can be greater, such as at least about 4500 micron %, at least about 5000 micron %, at least about 6000 micron %, at least about 7000 micron %, or even at least about 8000 micron %. Still, in one non-limiting embodiment, the height and flashing multiplier value can be not greater than about 45000 micron %, such as not greater than about 30000 micron %, not greater than about 25000 micron %, not greater than about 20000 micron %, or even not greater than about 18000 micron %. It will be appreciated that the height and flashing multiplier value of the body 301 can be within a range between any of the above minimum and maximum values. Moreover, it will be appreciated that the above multiplier value can be representative of a median multiplier value (MhiF) for a batch of shaped abrasive particles.

Coated Abrasive Article

After forming or sourcing the shaped abrasive particle 300, the particles may be combined with a backing to form a coated abrasive article. In particular, the coated abrasive article may utilize a plurality of shaped abrasive particles, which can be dispersed in a single layer and overlying the backing.

Figure 5:
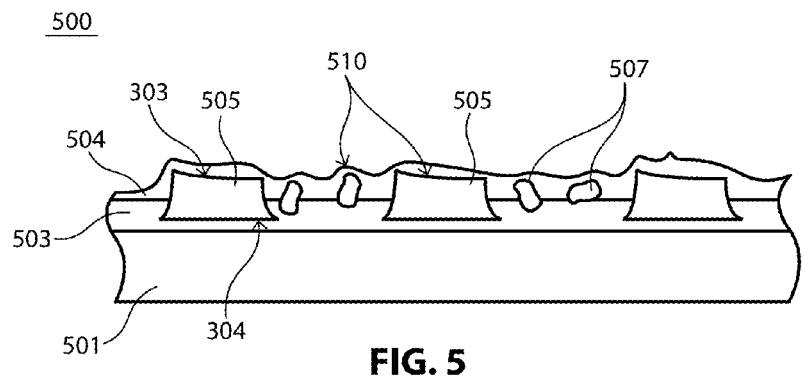
FIG. 5 includes a cross-sectional illustration of a portion of a coated abrasive article according to an embodiment.

As illustrated in FIG. 5, the coated abrasive 500 can include a substrate 501 (i.e., a backing) and at least one adhesive layer overlying a surface of the substrate 501. The adhesive layer can include a make coat 503 and/or a size coat 504. The coated abrasive 500 can include abrasive particulate material 510, which can include shaped abrasive particles 505 of the embodiments herein and a second type of abrasive particulate material 507 in the form of diluent abrasive particles having a random shape, which may not necessarily be shaped abrasive particles. The make coat 503 can be overlying the surface of the substrate 501 and surrounding at least a portion of the shaped abrasive particles 505 and second type of abrasive particulate material 507. The size coat 504 can be overlying and bonded to the shaped abrasive particles 505 and second type of abrasive particulate material 507 and the make coat 503.

According to one embodiment, the substrate 501 can include an organic material, inorganic material, and a combination thereof. In certain instances, the substrate 501 can include a woven material. However, the substrate 501 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

A polymer formulation may be used to form any of a variety of layers of the abrasive article such as, for example, a frontfill, a pre-size, the make coat, the size coat, and/or a supersize coat. When used to form the frontfill, the polymer formulation generally includes a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes and polyester acrylates and acrylated monomers including monoacrylated, multiacrylated monomers. The formulation can also comprise a nonreactive thermoplastic resin binder which can enhance the self-sharpening characteristics of the deposited abrasive composites by enhancing the erodability. Examples of such thermoplastic resin include polypropylene glycol, polyethylene glycol, and polyoxypropylene-polyoxyethene block copolymer, etc. Use of a frontfill on the substrate 501 can improve the uniformity of the surface, for suitable application of the make coat 503 and improved application and orientation of shaped abrasive particles 505 in a predetermined orientation.

The make coat 503 can be applied to the surface of the substrate 501 in a single process, or alternatively, the abrasive particulate material 510 can be combined with a make coat 503 material and applied as a mixture to the surface of the substrate 501. Suitable materials of the make coat 503 can include organic materials, particularly polymeric materials, including for example, polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and mixtures thereof. In one embodiment, the make coat 503 can include a polyester resin. The coated substrate can then be heated in order to cure the resin and the abrasive particulate material to the substrate. In general, the coated substrate 501 can be heated to a temperature of between about 100° C. to less than about 250° C. during this curing process.

The abrasive particulate material 510 can include shaped abrasive particles 505 according to embodiments herein. In particular instances, the abrasive particulate material 510 may include different types of shaped abrasive particles 505. The different types of shaped abrasive particles can differ from each other in composition, in two-dimensional shape, in three-dimensional shape, in size, and a combination thereof as described in the embodiments herein. As illustrated, the coated abrasive 500 can include a shaped abrasive particle 505 having a generally triangular two-dimensional shape.

The other type of abrasive particles 507 can be diluent particles different than the shaped abrasive particles 505. For example, the diluent particles can differ from the shaped abrasive particles 505 in composition, in two-dimensional shape, in three-dimensional shape, in size, and a combination thereof. For example, the abrasive particles 507 can represent conventional, crushed abrasive grit having random shapes. The abrasive particles 507 may have a median particle size less than the median particle size of the shaped abrasive particles 505.

After sufficiently forming the make coat 503 with the abrasive particulate material 510, the size coat 504 can be formed to overlie and bond the abrasive particulate material 510 in place. The size coat 504 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

According to one embodiment, the shaped abrasive particles 505 herein can be oriented in a predetermined orientation relative to each other and the substrate 501. While not completely understood, it is thought that one or a combination of dimensional features is responsible for the improved positioning of the shaped abrasive particles 505. According to one embodiment, the shaped abrasive particles 505 can be oriented in a flat orientation relative to the substrate 501, such as that shown in FIG. 5. In the flat orientation, the bottom surface 304 of the shaped abrasive particles can be closest to a surface of the substrate 501 (i.e., the backing) and the upper surface 303 of the shaped abrasive particles 505 can be directed away from the substrate 501 and configured to conduct initial engagement with a workpiece.

Figure 6:
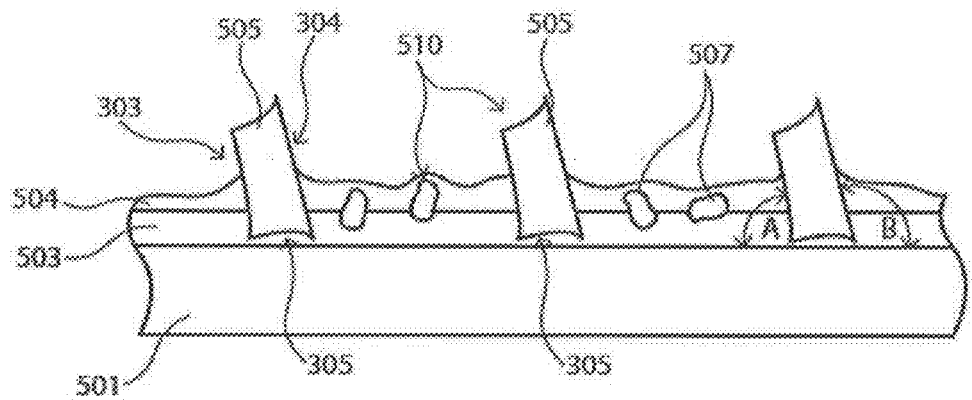
FIG. 6 includes a cross-sectional illustration of a portion of a coated abrasive article according to an embodiment.

According to another embodiment, the shaped abrasive particles 505 can be placed on a substrate 501 in a predetermined side orientation, such as that shown in FIG. 6. In particular instances, a majority of the shaped abrasive particles 505 of the total content of shaped abrasive particles 505 on the abrasive article 500 can have a predetermined and side orientation. In the side orientation, the bottom surface 304 of the shaped abrasive particles 505 can be spaced away and angled relative to the surface of the substrate 501. In particular instances, the bottom surface 304 can form an obtuse angle (A) relative to the surface of the substrate 501. Moreover, the upper surface 303 is spaced away and angled relative to the surface of the substrate 501, which in particular instances, may define a generally acute angle (B). In a side orientation, a side surface (305, 306, or 307) can be closest to the surface of the substrate 501, and more particularly, may be in direct contact with a surface of the substrate 501.

For certain other abrasive articles herein, at least about 55% of the plurality of shaped abrasive particles 505 on the abrasive article 500 can have a predetermined side orientation. Still, the percentage may be greater, such as at least about 60%, at least about 65%, at least about 70%, at least about 75%, at least about 77%, at least about 80%, at least about 81%, or even at least about 82%. And for one non-limiting embodiment, an abrasive article 500 may be formed using the shaped abrasive particles 505 herein, wherein not greater than about 99% of the total content of shaped abrasive particles have a predetermined side orientation.

To determine the percentage of particles in a predetermined orientation, a 2D microfocus x-ray image of the abrasive article 500 is obtained using a CT scan machine run in the conditions of Table 1 below. The X-ray 2D imaging was conducted on RB214 with Quality Assurance software. A specimen mounting fixture utilizes a plastic frame with a 4"×4" window and an 00.5" solid metallic rod, the top part of which is half flattened with two screws to fix the frame. Prior to imaging, a specimen was clipped over one side of the frame where the screw heads were faced with the incidence direction of the X-rays. Then five regions within the 4"×4" window area are selected for imaging at 120 kV/80 µA. Each 2D projection was recorded with the X-ray off-set/gain corrections and at a magnification of 15 times.

TABLE 1

| Voltage (kV) | Current (µA) | Magnification | Field of view per image (mm × mm) | Exposure time |
| --- | --- | --- | --- | --- |
| 120 | 80 | 15X | 16.2 × 13.0 | 500 ms/2.0 fps |

Figure 11:
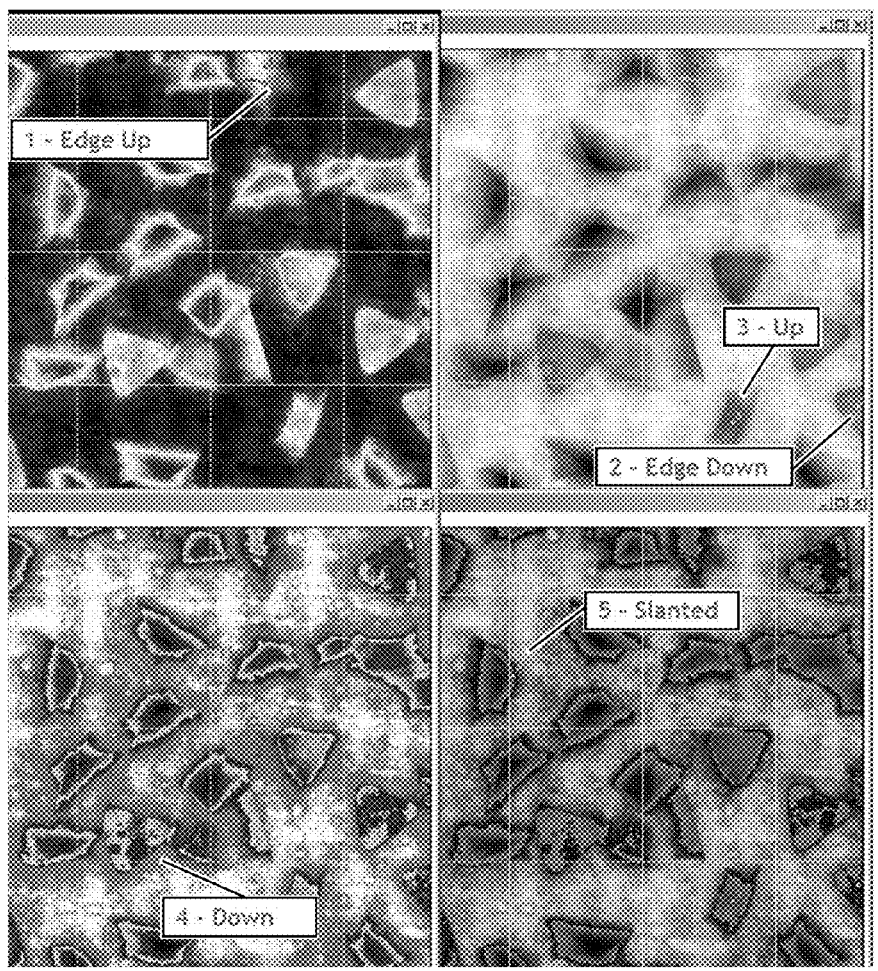
FIG. 11 includes images representative of portions of a coated abrasive according to an embodiment and used to analyze the orientation of shaped abrasive particles on the backing.

The image is then imported and analyzed using the ImageJ program, wherein different orientations are assigned values according to Table 2 below. FIG. 11 includes images representative of portions of a coated abrasive according to an embodiment and used to analyze the orientation of shaped abrasive particles on the backing.

TABLE 2

| Cell marker type | Comments |
| --- | --- |
| 1 | Grains on the perimeter of the image, partially exposed-standing up |

TABLE 2-continued

| Cell marker type | Comments |
|---|---|
| 2 | Grains on the perimeter of the image, partially exposed-down |
| 3 | Grains on the image, completely exposed-standing vertical |
| 4 | Grains on the image, completely exposed-down |
| 5 | Grains on the image, completely exposed-standing slanted (between standing vertical and down) |

Three calculations are then performed as provided below in Table 3. After conducting the calculations, the percentage of grains in a particular orientation (e.g., side orientation) per square centimeter can be derived.

TABLE 3

| 5) Parameter | Protocol* |
|---|---|
| % grains up | $((0.5 \times 1) + 3 + 5)/(1 + 2 + 3 + 4 + 5)$ |
| Total # of grains | $(1 + 2 + 3 + 4 + 5)$ |
| # of grains up | (% grains up × Total # of grains) |

*These are all normalized with respect to the representative area of the image per cm².
+ - A scale factor of 0.5 (See % of grains up in the numerator) was applied to account for the fact that they are not completely present in the image.

Furthermore, the abrasive articles made with the shaped abrasive particles can utilize various contents of the shaped abrasive particles. For example, the abrasive articles can be coated abrasive articles including a single layer of the shaped abrasive particles in an open-coat configuration or a closed-coat configuration. For example, the plurality of shaped abrasive particles can define an open-coat abrasive product having a coating density of shaped abrasive particles of not greater than about 70 particles/cm². In other instances, the density of shaped abrasive particle per square centimeter of the open-coat abrasive article may be not greater than about 65 particles/cm², such as not greater than about 60 particles/cm², not greater than about 55 particles/cm², or even not greater than about 50 particles/cm². Still, in one non-limiting embodiment, the density of the open-coat coated abrasive using the shaped abrasive particle herein can be at least about 5 particles/cm², or even at least about 10 particles/cm². It will be appreciated that the density of shaped abrasive particles per square centimeter of an open-coat coated abrasive article can be within a range between any of the above minimum and maximum values.

In an alternative embodiment, the plurality of shaped abrasive particles can define a closed-coat abrasive product having a coating density of shaped abrasive particles of at least about 75 particles/cm², such as at least about 80 particles/cm², at least about 85 particles/cm², at least about 90 particles/cm², at least about 100 particles/cm². Still, in one non-limiting embodiment, the density of the closed-coat coated abrasive using the shaped abrasive particle herein can be not greater than about 500 particles/cm². It will be appreciated that the density of shaped abrasive particles per square centimeter of the closed-coat abrasive article can be within a range between any of the above minimum and maximum values.

In certain instances, the abrasive article can have an open-coat density of a coating not greater than about 50% of abrasive particle covering the exterior abrasive surface of the article. In other embodiments, the percentage coating of the abrasive particles relative to the total area of the abrasive surface can be not greater than about 40%, not greater than about 30%, not greater than about 25%, or even not greater than about 20%. Still, in one non-limiting embodiment, the percentage coating of the abrasive particles relative to the total area of the abrasive surface can be at least about 5%, such as at least about 10%, at least about 15%, at least about 20%, at least about 25%, at least about 30%, at least about 35%, or even at least about 40%. It will be appreciated that the percent coverage of shaped abrasive particles for the total area of abrasive surface can be within a range between any of the above minimum and maximum values.

Some abrasive articles may have a particular content of abrasive particles for a length (e.g., ream) of the backing or the substrate 501. For example, in one embodiment, the abrasive article may utilize a normalized weight of shaped abrasive particles of at least about 20 lbs/ream, such as at least about 25 lbs/ream, or even at least about 30 lbs/ream. Still, in one non-limiting embodiment, the abrasive articles can include a normalized weight of shaped abrasive particles of not greater than about 60 lbs/ream, such as not greater than about 50 lbs/ream, or even not greater than about 45 lbs/ream. It will be appreciated that the abrasive articles of the embodiments herein can utilize a normalized weight of shaped abrasive particle within a range between any of the above minimum and maximum values.

The plurality of shaped abrasive particles on an abrasive article as described herein can define a first portion of a batch of abrasive particles, and the features described in the embodiments herein can represent features that are present in at least a first portion of a batch of shaped abrasive particles. Moreover, according to an embodiment, control of one or more process parameters as already described herein also can control the prevalence of one or more features of the shaped abrasive particles of the embodiments herein. The provision of one or more features of any shaped abrasive particle of a batch may facilitate alternative or improved deployment of the particles in an abrasive article and may further facilitate improved performance or use of the abrasive article.

The first portion of a batch of abrasive particles may include a plurality of shaped abrasive particles where each of those particles of the first portion can have substantially the same features, including but not limited to, for example, the same two-dimensional shape of a major surface. Other features include any of the features of the embodiments herein. The batch may include various contents of the first portion. The first portion may be a minority portion (e.g., less than 50% and any whole number integer between 1% and 49%) of the total number of particles in a batch, a majority portion (e.g., 50% or greater and any whole number integer between 50% and 99%) of the total number of particles of the batch, or even essentially all of the particles of a batch (e.g., between 99% and 100%). For example, the first portion may be present in a minority amount or majority amount. In particular instances, the first portion may be present in an amount of at least about 1%, such as at least about 5%, at least about 10%, at least about 20%, at least about 30%, at least about 40%, at least about 50%, at least about 60%, or even at least about 70% for the total content of portions within the batch. Still, in another embodiment, the batch may include not greater than about 99%, such as not greater than about 90%, not greater than about 80%, not greater than about 70%, not greater than about 60%, not greater than about 50%, not greater than about 40%, not greater than about 30%, not greater than about 20%, not greater than about 10%, not greater than about 8%, not greater than about 6%, or even not greater than about 4% of the total portions within the batch. The batch can include a content of the first portion within a range between any of the minimum and maximum percentages noted above.

The batch may also include a second portion of abrasive particles. The second portion of abrasive particles can include diluent particles. The second portion of the batch can include a plurality of abrasive particles having at least one abrasive characteristic distinct from the plurality of shaped abrasive particles of the first portion, including but not limited to abrasive characteristics such as two-dimensional shape, average particle size, particle color, hardness, friability, toughness, density, specific surface area, aspect ratio, any of the features of the embodiments herein, and a combination thereof.

In certain instances, the second portion of the batch can include a plurality of shaped abrasive particles, wherein each of the shaped abrasive particles of the second portion can have substantially the same feature compared to each other, including but not limited to, for example, the same two-dimensional shape of a major surface. The second portion can have one or more features of the embodiments herein, which can be distinct compared to the plurality of shaped abrasive particles of the first portion. In certain instances, the batch may include a lesser content of the second portion relative to the first portion, and more particularly, may include a minority content of the second portion relative to the total content of particles in the batch. For example, the batch may contain a particular content of the second portion, including for example, not greater than about 40%, such as not greater than about 30%, not greater than about 20%, not greater than about 10%, not greater than about 8%, not greater than about 6%, or even not greater than about 4%. Still, in at least one non-limiting embodiment, the batch may contain at least about 0.5%, such as at least about 1%, at least about 2%, at least about 3%, at least about 4%, at least about 10%, at least about 15%, or even at least about 20% of the second portion for the total content of portions within the batch. It will be appreciated that the batch can contain a content of the second portion within a range between any of the minimum and maximum percentages noted above.

Still, in an alternative embodiment, the batch may include a greater content of the second portion relative to the first portion, and more particularly, can include a majority content of the second portion for the total content of particles in the batch. For example, in at least one embodiment, the batch may contain at least about 55%, such as at least about 60%, of the second portion for the total content of portions of the batch.

It will be appreciated that the batch can include additional portions, including for example a third portion, comprising a plurality of shaped abrasive particles having a third feature that can be distinct from the features of the particles of either or both of the first and second portions. The batch may include various contents of the third portion relative to the second portion and first portion. The third portion may be present in a minority amount or majority amount. In particular instances, the third portion may be present in an amount of not greater than about 40%, such as not greater than about 30%, not greater than about 20%, not greater than about 10%, not greater than about 8%, not greater than about 6%, or even not greater than about 4% of the total portions within the batch. Still, in other embodiments the batch may include a minimum content of the third portion, such as at least about 1%, such as at least about 5%, at least about 10%, at least about 20%, at least about 30%, at least about 40%, or even at least about 50%. The batch can include a content of the third portion within a range between any of the minimum and maximum percentages noted above. Moreover, the batch may include a content of diluent, randomly shaped abrasive particles, which may be present in an amount that is the same as any of the portions of the embodiments herein.

According to another aspect, the first portion of the batch can have a predetermined classification characteristic selected from the group consisting of average particle shape, average particle size, particle color, hardness, friability, toughness, density, specific surface area, and a combination thereof. Likewise, any of the other portions of the batch may be classified according to the above noted classification characteristics.

Method of Using the Coated Abrasive Article

In accordance with an embodiment, the coated abrasive articles of the embodiments herein are remarkably suited for conducting material removal operations at high average material removal rates (i.e., a high-speed, high-efficiency grinding operation). For example, according to one embodiment, the coated abrasive articles of the embodiments herein are capable of conducting material removal operations at an average material removal rate of at least about 6 $in^3/min/in$. The average material removal rate may be measured as the average material removal rate obtained to finish a material removal operation on at least one workpiece. It will be appreciated however, that an average material removal rate may be calculated based finishing of more than one workpiece. In another embodiment, the method of removing material from a workpiece using the coated abrasive articles of the embodiments herein can be conducted at an average material removal rate of at least about 6.1 $in^3/min/in$, such as at least about 6.2 $in^3/min/in$, at least about 6.3 $in^3/min/in$, at least about 6.4 $in^3/min/in$, at least about 6.5 $in^3/min/in$, at least about 6.5 $in^3/min/in$, at least about 6.6 $in^3/min/in$, at least about 6.7 $in^3/min/in$, at least about 6.8 $in^3/min/in$, at least about 6.9 $in^3/min/in$, at least about 7 $in^3/min/in$, at least about 7.1 $in^3/min/in$, at least about 7.2 $in^3/min/in$, at least about 7.3 $in^3/min/in$, at least about 7.4 $in^3/min/in$, at least about 7.5 $in^3/min/in$, at least about 7.6 $in^3/min/in$, at least about 7.7 $in^3/min/in$, at least about 7.8 $in^3/min/in$, at least about 7.9 $in^3/min/in$, at least about 8 $in^3/min/in$. Still, in another embodiment, the method of removing material from a workpiece using the coated abrasive articles of the embodiments herein can be conducted at an average material removal rate of not greater than about 25 $in^3/min/in$, such as not greater than about 24 $in^3/min/in$, not greater than about 23 $in^3/min/in$, not greater than about 22 $in^3/min/in$, not greater than about 21 $in^3/min/in$, not greater than about 20 $in^3/min/in$, not greater than about 19 $in^3/min/in$, not greater than about 18 $in^3/min/in$, not greater than about 17 $in^3/min/in$, not greater than about 16 $in^3/min/in$, not greater than about 15 $in^3/min/in$, not greater than about 14 $in^3/min/in$, not greater than about 13 $in^3/min/in$, or even not greater than about 12 $in^3/min/in$. It will be appreciated that the average material removal rate for a grinding operation can be within a range between any of the minimum and maximum values noted above.

According to one aspect, the workpieces suitable for conducting material removal operations can include organic or inorganic materials. For example, in one embodiment, the workpiece can include a metal or metal alloy. In another embodiment, the workpiece can include iron, and may include steel, such as a stainless steel. For at least one embodiment, the workpiece consists essentially of 304 stainless steel. In certain instances, the workpiece can include steel having a content of carbon of greater than about 0.05 wt % for the total weight of the workpiece. In one embodiment, the content of carbon in the workpiece may be at least about 0.08 wt %, at least 0.1 wt %, or even between about 0.15 wt % and not greater than about 0.3 wt %. Still, it will be appreciated that the coated abrasive articles of the embodiments herein may be suitable for conducting material removal operations on other materials, such as nickel-based materials, such as nickel-based super alloys.

In another embodiment, the coated abrasive articles herein can be used to conduct a material removal operation capable of removing a cumulative amount of material from one or more workpieces of at least about 5000 grams of material removed from the workpiece per inch of width (or diameter) of the workpiece in contact with the coated abrasive. According to one embodiment, the coated abrasive article can conduct a material removal operation capable of removing a cumulative amount of material from one or more workpieces of at least about 6,000 On, such as at least about 6,500 Win, at least about 7,000 Win, at least about 7,500 On, at least about 7,000 On, at least about 7,500 On, at least about 8,000 On, at least about 8,500 On, at least about 9,000 On, at least about 10,00 g/in, at least about 11,500 Win, at least about 12,000 Win. Still, in one non-limiting embodiment, the coated abrasive articles herein can be used to conduct a material removal operation capable of removing a cumulative amount of material from one or more workpieces of not greater than about 50,000 On, such as not greater than about 30,000 g/in. It will be appreciated that the cumulative amount of material removed from the workpiece in the material removal operation can be within a range between any of the minimum and maximum values noted above.

In certain non-limiting embodiments, the coated abrasive articles herein can be used to conduct a material removal operation having a particular maximum specific grinding energy relative to an initial amount of material removed. For example, removing material using the coated abrasive articles of the embodiments herein can be completed at a maximum specific grinding energy of not greater than about 2.9 hp min/in$^3$ per 6000 grams/in of initial material removed from the one or more workpieces. In still other instances, the process of removing material can be completed at a maximum specific grinding energy of not greater than about 2.8 hp min/in$^3$, such as not greater than about 2.7 hp min/in$^3$, not greater than about 2.6 hp min/in$^3$, not greater than about 2.5 hp min/in$^3$, not greater than about 2.4 hp min/in$^3$, or even not greater than about 2.3 hp min/in$^3$ for 6000 grams/in of initial material removed from the one or more workpieces.

In other non-limiting embodiments, the coated abrasive articles herein can be used to conduct a material removal operation having a certain maximum specific grinding energy relative to a particular amount of material removed. For example, removing material using the coated abrasive articles of the embodiments herein can be completed at a maximum specific grinding energy of not greater than about 2.7 hp min/in$^3$ per 6000 grams/in of initial material removed from the one or more workpieces. In still other instances, the process of removing material can be completed at a maximum specific grinding energy of not greater than about 2.7 hp min/in$^3$ per 8000 grams/in of initial material removed from the one or more workpieces, such as not greater than about 2.7 hp min/in$^3$ per 10000 grams/in of initial material removed from the one or more workpieces, or even not greater than about 2.7 hp min/in$^3$ per 12000 grams/in of material removed from the one or more workpieces. For another embodiment, the process of removing material from one or more workpieces using the coated abrasive articles of the embodiments herein can be conducted at a maximum specific grinding energy of not greater than about 2.6 hp min/in$^3$ per 8000 grams/in of initial material removed from the one or more workpieces, such as not greater than about 2.6 hp min/in$^3$ per 9000 grams/in of initial material removed from the one or more workpieces, not greater than about 2.6 hp min/in$^3$ per 10000 grams/in of initial material removed from the one or more workpieces, not greater than about 2.6 hp min/in$^3$ per 11000 grams/in of material removed from the one or more workpieces, or even not greater than about 2.6 hp min/in$^3$ per 12000 grams/in of initial material removed from the one or more workpieces. Still, in at least one non-limiting embodiment, the process of removing material from one or more workpieces using the coated abrasive articles of the embodiments herein can be completed at a maximum specific grinding energy of at least about 1 hp min/in$^3$ per 7000 grams/in of initial material removed from the one or more workpieces. It will be appreciated that the maximum specific grinding energy for a particular amount of material removed from the one or more workpieces can be within a range between any of the minimum and maximum values noted above.

It is remarkable to note that the coated abrasive articles of the embodiments herein can be used in a material removal operation and maintain a substantially constant G-ratio over a range of average material removal rate between at least 6 in$^3$/min/in and not greater than about 25 in$^3$/min/in. That is, unlike conventional coated abrasive products that would have a significant change in G-ratio for different average material removal rates, the present coated abrasive articles have demonstrated the ability to maintain a substantially constant G-ratio over a range of high average material removal rates.

Figure 7:
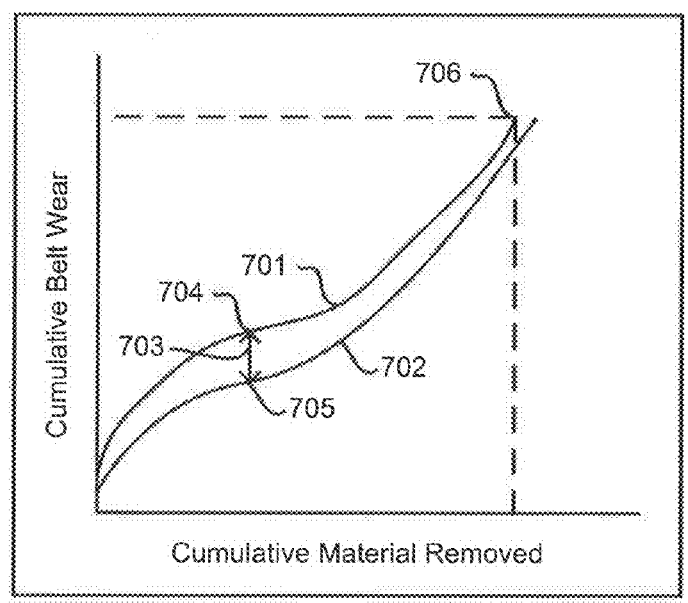
FIG. 7 includes a generalized plot of cumulative belt wear versus cumulative material removed for a material removal operation conducted at two different specific grinding energies.

For another embodiment, the process of removing material from one or more workpieces can be conducted using the coated abrasive articles of the embodiments herein, at an average material removal rate within a range between at least 6 in$^3$/min/in and not greater than about 15 in$^3$/min/in, with a G-ratio variance over the range of average material removal rates of not greater than about 30%. The G-ratio variance can described the maximum difference in G-ratio (e.g., an end G-ratio) for two material removal operations conducted at different average material removal rates. Notably, it has been discovered that material removal operations can be completed at high material removal rates using the coated abrasive articles of the embodiments herein. For example, referring to FIG. 7, a generalized plot of cumulative belt wear versus cumulative material removed for a material removal operation conducted at two different specific grinding energies is shown. In particular, FIG. 7 includes a first plot 701 representing at least a portion of a material removal operation conducted at one material removal rate and a second plot 702 representing at least a portion of a material removal operation conducted at a second material removal rate different than the material removal rate for the portion of the operation of plot 701. The G-ratio variance can be calculated as the difference in G-ratio at the point of maximum difference between the plots, represented by the arrow 703. The G-ratio (i.e., cumulative material removed from the workpiece divided by the cumulative belt wear) can be calculated at point 704 and 705. The difference between the G-ratio at point 704 and 705 defines the G-ratio variance. The coated abrasive articles of the embodiments herein have demonstrated a G-ratio variance in certain material removal operations of not greater than about 28%, not greater than about 26%, not greater than about 24%, not greater than about 22%, not greater than about 20%. Still, in at least one embodiment, the G-ratio variance for a material removal process using the coated abrasive articles of the embodiments herein can be at least about 1%. It will be appreciated that the G-ratio variance may be measured for at least two different material removal operations at two different material removal rates within the range of average material removal rates. Moreover, the difference in the average material removal rates for the two different material removal operations may be at least about 1 in³/min/in, such as at least about 1.5 in³/min/in, or even at least about 2 in³/min/in.

The coated abrasive articles of the embodiments herein may be suitable for conducting material removal operations in an improved manner. For example, in at least one embodiment, the material removal operation using the coated abrasive articles of the embodiments herein can be completed with an end G-ratio of at least about 350. The end G-ratio can be calculated as the cumulative material removed from the one or more workpieces divided by the cumulative material lost from the coated abrasive article at the end of the material removal operation. For example, referring again to the plot of FIG. 7, the end G-ratio for the plot 701 is defined as the cumulative material removed divided by the cumulative belt wear at point 706. The end of the material removal operation is generally regarded as the time at which the coated abrasive is no longer effective at removing material from the workpiece. In another embodiment, the end G-ratio for a material removal operation using the coated abrasive articles of the embodiments herein can be at least about 360, such as at least about 370, at least about 380, at least about 390, at least about 400, at least about 410, at least about 420, at least about 430, at least about 440, at least about 450, at least about 460, at least about 470, at least about 480, at least about 490. Still, in one non-limiting embodiment, the end G-ratio for a material removal operation using the coated abrasive articles of the embodiments herein can be not greater than about 10000, such as not greater than about 5000, not greater than about 2000, not greater than about 1000. The end G-ratio may be within a range between any of the minimum and maximum values noted above.

Example 1

Two samples were used to conduct a comparative grinding operation. Sample S1 was a coated abrasive including the abrasive particles of the embodiments herein.

Figure 8:
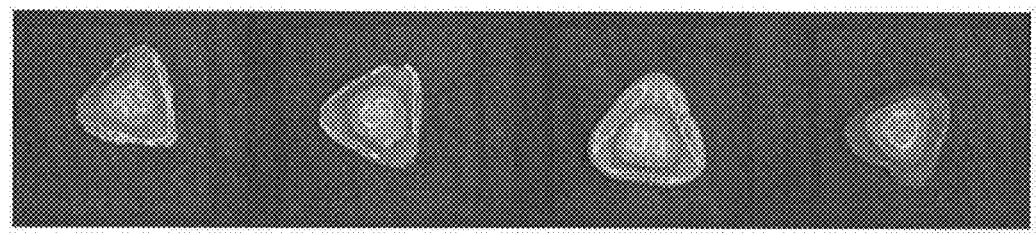
FIG. 8 includes an image of shaped abrasive particles of samples S1 of Example 1.

The shaped abrasive particles of Sample S1 were formed using a screen printing process. A mixture, which is in the form of a gel, was initially made including approximately 42 wt % boehmite commercially available as Catapal B from Sasol Corporation, 1 wt % sub-micron alpha alumina with respect to final alpha alumina content in the body wherein the sub-micron alpha alumina having a BET surface area greater than 120 m2/g and 2 to 4 wt % nitric acid. The mixture was extruded through a die opening and through a screen having triangular shaped openings. The triangular shaped openings had a side length of 2.38 mm and a depth of approximately 600 microns. No release agent was provided on the interior surfaces of the screen that define the openings. The screen was moved at a rate of approximately 1 foot/min and was released from the underlying belt at an angle of approximately 10° to 40°. The release distance was approximately zero, and the screen and belt were separated upon entry of the application zone and prior to filling of the openings with the gel. The approximate resident time of the mixture in the openings was less than 10 seconds. Shaped abrasive precursor particles were formed on the belt underlying the screen and then dried at a temperature of 95° C. for approximately 4-7 minutes. The dried particles were gathered and calcined at a temperature of 1000° C. for a duration of 10 min and then sintered at a temperature of approximately 1300° C. for a duration of approximately 30 min. The shaped abrasive particles had a median interior height of about 550 microns, a median width of 1.3 mm and a dishing value of 1.1. FIG. 8 includes an image of the shaped abrasive particles. Notably, some of the particles had a ridge extending along the top surface. The shaped abrasive particles were placed on a backing in a substantially random orientation.

The backing of Sample S1 includes finished cloth of approximately 47 pounds per ream. The backing was coated with a make formulation including a phenol formaldehyde resin as provided in Table 4. Using an electrostatic deposition process, 41 pounds per ream of abrasive particles having the shape and microstructure as outlined above was applied to the belt with the make coat. The structure was dried in an oven for two hours at 80° C. It will be appreciated that the make coat is created such that sum of the components provided in Table 4 equals 100%.

TABLE 4

Make Coat Formulation

| Make Formulation Component | Percentage |
| --- | --- |
| Filler NYAD Wollastonite 400 | 45-50 wt % |
| Wet Witcona 1260 | 0.10-.2 wt % |
| Resin, SI | 45-50 wt % |
| Solmod Silane A1100 | 0.1-3 wt % |
| Water | 0.1-1 wt % |

The coated abrasive structure was then coated with a size coat having the formulation presented in Table 5. The construction was heat treated in an oven set for a final soak temperature of 100-120° C., in which the sample was held for approximately 20-30 minutes. It will be appreciated that the size coat is created such that sum of the components provided in Table 5 equals 100%.

TABLE 5

Size Coat Formulation

| Size Formulation Component | Percentage |
| --- | --- |
| Dye | 2-4 wt % |
| Solmod Tamol 165A | 0.5-2 wt % |
| Filler Syn Cryolite K | 40-45 wt % |
| Resin Single Comp 94-908 | 50-55 wt % |
| DF70 Defoamer | 0.1-0.2 wt % |
| Water | 2-4 wt % |

The coated abrasive sample was then placed into an oven to undergo heat treatment. The oven temperature was set for a final soak temperature of approximately 110-120° C., in which the sample was held for approximately 10-12 hours.

A supersize coat having the formulation provided below in Table 6 was then applied to Sample S1 and processed in the same manner as the size coat. It will be appreciated that the supersize coat is created such that sum of the components provided in Table 6 equals 100%.

TABLE 6

Supersize Coat Formulation

| Supersize Formulation Component | Percentage |
| --- | --- |
| Dye | 1-3 wt % |
| Solmod Cabosil | 0.05-3 wt % |
| Solmod DAXAD 11 | 1-4 wt % |

TABLE 6-continued

Supersize Coat Formulation

| Supersize Formulation Component | Percentage |
|---|---|
| Filler Type A | 63-67 wt % |
| Resin PF Prefere 80-5080A | 20-25 wt % |
| DF70 Defoamer | 0.1-0.2 wt % |
| Water | 6-10 wt % |

A second, comparative sample (Sample CS2) was a Cubitron II belt commercially available from 3M as 3M984F. Approximately 72% of the abrasive particles were positioned in a predetermined side orientation on the backing.

The samples were tested according to the conditions summarized below in Table 7. Notably, for each of the samples two trials were tested in each case to derive the results for a single plot. Moreover, sample S1 was tested at material removal rates of 6.0 inch$^3$/min/inch and 8.0 inch$^3$/min/inch, and sample CS2 was tested at material removal rates of tested at material removal rates of 4.0 inch$^3$/min/inch, 6.0 inch$^3$/min/inch, and 8.0 inch$^3$/min/inch.

The material removal test operation was conducted to simulate actual grinding operations in various industries. During one grinding interval of the grinding test, a cylindrical workpiece material part was plunged onto the coated abrasive article at a given infeed rate while the part was rotated at a given rotational speed. The part was plunged into the coated abrasive article until a predetermined depth of cut was reached, at which time the part was retracted. By this approach, a given amount of material was removed in a given time, rendering a specific, average material removal rate (MRR). During the material removal test operation, the grinding power was monitored, and after each grinding interval, the workpiece was weighed to determine whether the target average MRR was achieved. At predetermined grinding intervals, the belt wear was monitored by weighing the belt and by measuring the change in thickness of the belt. The results were reported as specific grinding energy (SGE) (Power/Metal Removal Rate) as a function of time or cumulative material removed. The total amount of material removed when a predetermined SGE was obtained was also monitored. Further details of the testing parameters are provided in Table 7 below.

The test was performed in an automated grinding system including a backstand grinder with a 30 hp capacity motor. The power and time for each grinding interval was measured with a power monitor. Material removed from the workpiece was measured using a Mettler Toledo scale with an accuracy of 0.01 g. Belt wear was measured by weight using a Mettler Toledo scale with an accuracy of 0.01 g and with a micrometer with an accuracy of 0.0001 inches.

TABLE 7

| Test conditions: | Dry, direct plunge and part rotation |
|---|---|
| Constant MRR' | 4.0 inch$^3$/min/inch or 6.0 inch$^3$/min/inch or 8.0 inch$^3$/min/inch |
| Infeed rate (Vf) | Changes depending on the MRR |
| Wheel speed (Vs) | 7500 sfpm (38 m/s) |
| Workpece rotation | 20 rpm |
| Contact wheel | Steel |
| Work material: | 304 Stainless steel Hardness HRB = 104 Rods with diameter 1.125 inch |
| Key Measurements: | Power, MRR' and SGE Cum Material Removed compared at SGE cutoff value of 3.2 hp min/inch$^3$ |

During the material removal test operation, the system was programmed to pick up one workpiece at a time at one end, plunge and rotate the workpiece onto the coated abrasive article. The coated abrasive article generally has dimensions of 2×72 inches. The workpiece was plunged into the coated abrasive in a particular manner to achieve a target average material removal rate, which is defined as the highest material removal rate achieved during the particular grinding interval. In this particular operation, the workpiece was plunged at an infeed rate suitable to achieve the target material removal rate. The rotational speed of the workpiece was 10.6 in/s (20 rpm), the coated abrasive article speed was Vs=7500 sfpm, and the total plunge depth (depth of cut) was adjusted to achieve the target material removal rate, rendering a target average MRR of 4.0 inch$^3$/min/inch, 6.0 in$^3$/min in, or 8.0 in$^3$/min in. The workpieces were 304 stainless steel of a cylindrical shape, having a diameter of 1.125 inches, and a height of 6 inches. The width of the grinding track on the coated abrasive was 1.125 inches and the workpiece contacted the same grinding track throughout the test. The grinding intervals were conducted serially with about 25 seconds between the grinding intervals. The grinding test continued until the SGE exceeded a cutoff point of 3.2 hp min/inch$^3$ for 5 consecutive grinding intervals or until the belt thickness reached 0.050" measured using a micrometer.

For each grinding interval, the weight of the workpiece before and after the grinding interval, the average grinding power, the peak grinding power, and duration of the grinding interval were measured. From the measurements, the average MRR for each grinding interval was calculated as volume removed (from weight using work material density) per unit time and width of the wear track. The specific grinding was calculated for each grinding interval as the average power divided by the average material removal rate (hp min/inch$^3$). At predetermined intervals, the wear of the coated abrasive was monitored by weighing the article. The weight of the coated abrasive before and after the test was determined, and knowing the change in belt weight and the material removed from the workpiece, the G-ratio of the coated abrasive was calculated.

Figure 9:
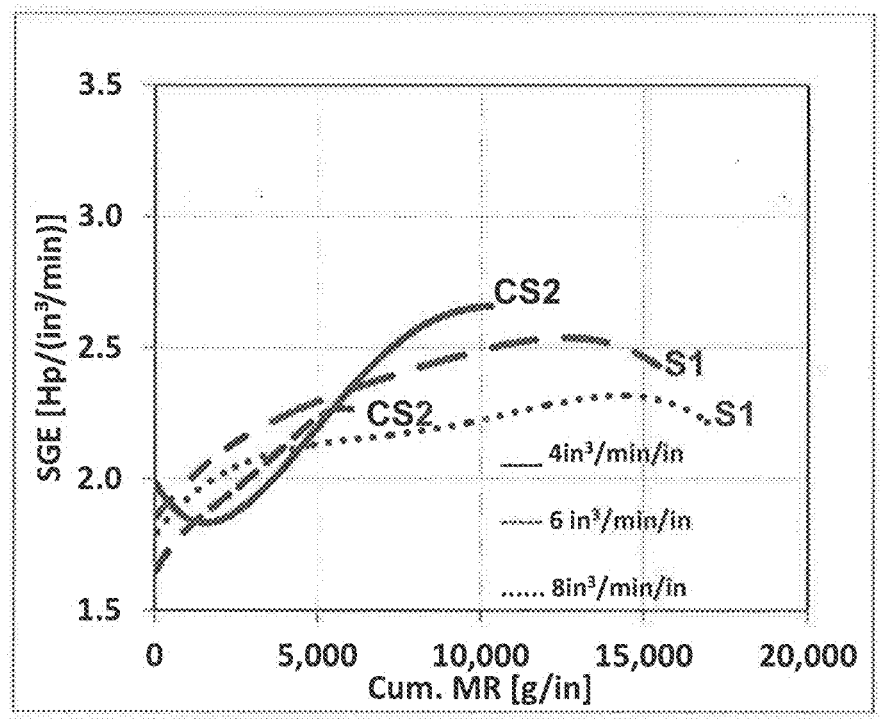
FIG. 9 includes a plot of specific grinding energy versus cumulative material removed for a conventional abrasive article and an abrasive article representative of embodiments herein.
Figure 10:
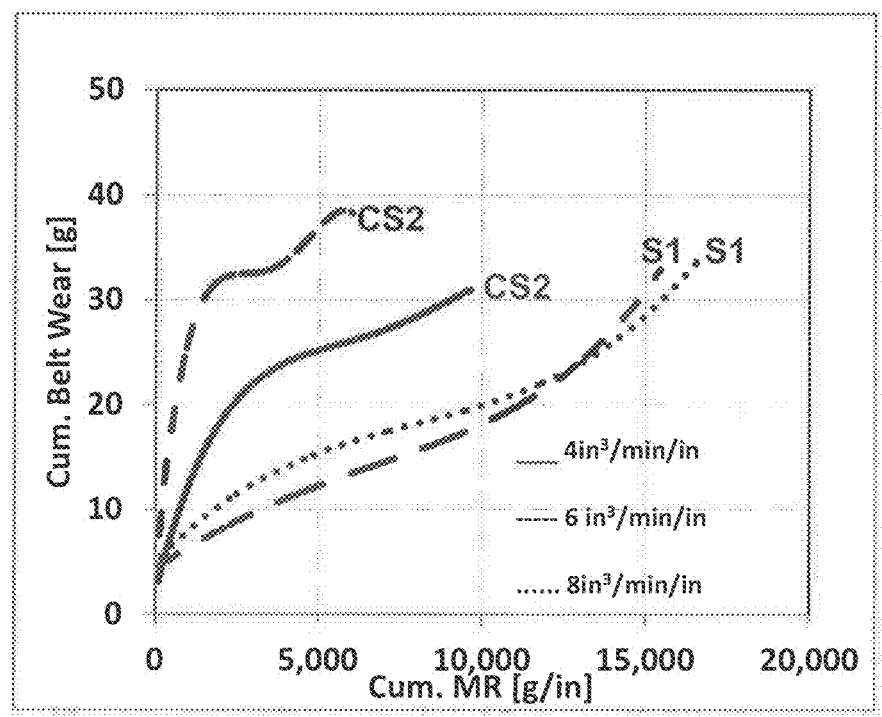
FIG. 10 includes a plot of specific grinding energy versus cumulative material removed for a conventional abrasive article and an abrasive article representative of embodiments herein.

FIG. 9 includes a plot of specific grinding energy versus cumulative material removed for each of the samples tested according to the material removal test operation. FIG. 10 includes a plot of cumulative wear of the sample versus cumulative material removed for each of the samples tested according to the material removal test operation. As clearly illustrated, sample S1 had markedly better performance compared to sample CS2. In particular, sample S1 demonstrated a vastly better life (i.e., cumulative material removed in grams of material removed from the workpiece per inch of width of the grinding track) at the high material removal operations compared to sample CS2. Moreover, and quite remarkably, sample S1 demonstrated a decrease in specific grinding energy and an increase in cumulative material removed with an increase in material removal rate. This behavior is quite remarkable, since as evidenced by the behavior of sample CS2, an increase in material removal rate typically results in a decrease in the cumulative material removed due to more aggressive cutting.

Moreover, as shown in FIG. 10, sample S1 demonstrated much lower belt wear for a given amount of material removed from the workpiece (i.e., G-ratio) as compared to sample CS2. Moreover, as depicted in FIG. 10, the G-ratio for sample S1 at 6 inch³/min/inch and 8 inch³/min/inch is substantially the same. The G-ratio variance of Sample S1 is less than 10%, the end G-ratio for S1 at 6 inch³/min/inch is approximately 460, and the end G-ratio of S1 at 8 inch³/min/inch is approximately 500. On the other hand, sample CS2 demonstrated a significant decrease in the G-ratio as the material removal rate is increased. More particularly, sample CS2 demonstrated a significant decrease in cumulative material removed at 6 inch³/min/inch compared to the cumulative material removed at 4 inch³/min/inch. Notably, CS2 was not able to conduct grinding at a material removal rate of 8 inch³/min/inch and higher.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The present application represents a departure from the state of the art. The coated abrasive articles of the embodiments have demonstrated a remarkable ability to perform at high material removal rate operations. Moreover, the coated abrasive articles herein are capable of being used at high material removal rates and have proven to be less sensitive in terms of performance and life to increases in material removal rate in a grinding operation compared to conventional samples.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

Item 1. A method of removing material from one or more workpieces including moving a coated abrasive article comprising a plurality of shaped abrasive particles relative to a surface of the one or more workpieces at an average material removal rate of at least 6 in³/min/in.

Item 2. A method of conducting a high-speed, high-efficiency grinding operation including removing material from one or more workpieces by moving a coated abrasive article comprising a plurality of shaped abrasive particles relative to a surface of the one or more workpieces at an average material removal rate within a range between at least 6 in³/min/in and not greater than about 25 in³/min/in, wherein removing includes a G-ratio variance for at least two different material removal operations at two different material removal rates within the range of average material removal rates of not greater than about 30%.

Item 3. The method of any one of items 1 and 2, wherein the average material removal rate is at least about 6.1 in³/min/in, at least about 6.2 in³/min/in, at least about 6.3 in³/min/in, at least about 6.4 in³/min/in, at least about 6.5 in³/min/in, at least about 6.5 in³/min/in, at least about 6.6 in³/min/in, at least about 6.7 in³/min/in, at least about 6.8 in³/min/in, at least about 6.9 in³/min/in, at least about 7 in³/min/in, at least about 7.1 in³/min/in, at least about 7.2 in³/min/in, at least about 7.3 in³/min/in, at least about 7.4 in³/min/in, at least about 7.5 in³/min/in, at least about 7.6 in³/min/in, at least about 7.7 in³/min/in, at least about 7.8 in³/min/in, at least about 7.9 in³/min/in, at least about 8 in³/min/in.

Item 4. The method of any one of items 1 and 2, wherein the average material removal rate is not greater than about 24 in³/min/in, not greater than about 23 in³/min/in, not greater than about 22 in³/min/in, not greater than about 21 in³/min/in, greater than about 20 in³/min/in, not greater than about 19 in³/min/in, not greater than about 18 in³/min/in, not greater than about 17 in³/min/in, not greater than about 16 in³/min/in, greater than about 15 in³/min/in, not greater than about 14 in³/min/in, not greater than about 13 in³/min/in, not greater than about 12 in³/min/in.

Item 5. The method of any one of items 1 and 2, wherein removing material from the one or more workpieces includes completing the material removal operation with an end G-ratio of at least about 350, at least about 360, at least about 370, at least about 380, at least about 390, at least about 400, at least about 410, at least about 420, at least about 430, at least about 440, at least about 450, at least about 460, at least about 470, at least about 480, at least about 490.

Item 6. The method of any one of items 1 and 2, wherein removing material from the one or more workpieces includes completing the material removal operation with an end G-ratio of not greater than about 10000, not greater than about 5000, not greater than about 2000, not greater than about 1000.

Item 7. The method of any one of items 1 and 2, wherein removing material from the one or more workpieces includes removing material for at least two different material removal operations at two different material removal rates within the range of average material removal rates between at least 6 in³/min/in and not greater than about 25 in³/min/in and maintaining a substantially constant G-ratio over the range of average material removal rates.

Item 8. The method of any one of items 1 and 2, wherein the one or more workpiece comprises a metal or metal alloy.

Item 9. The method of any one of items 1 and 2, wherein the one or more workpieces comprises iron.

Item 10. The method of any one of items 1 and 2, wherein the one or more workpieces comprises steel.

Item 11. The method of any one of items 1 and 2, wherein the one or more workpieces comprises stainless steel.

Item 12. The method of any one of items 1 and 2, wherein the one or more workpieces consists essentially of 304 stainless steel.

Item 13. The method of any one of items 1 and 2, wherein removing material comprises removing a cumulative amount of material from the one or more workpieces of at least about 6000 grams/in, at least about 6500 grams/in, at least about 7000 grams/in, at least about 7500 grams/in, at least about 8000 grams/in, at least about 8500 grams/in, at least about 9000 grams/in, at least about 9500 grams/in, at least about 10000 grams/in, at least about 10500 grams/in, at least about 11000 grams/in, at least about 11500 grams/in, at least about 12000 grams/in.

Item 14. The method of any one of items 1 and 2, wherein removing material comprises removing a cumulative amount of material from the one or more workpieces of not greater than about 50000 grams/in, not greater than about 30000 grams/in.

Item 15. The method of any one of items 1 and 2, wherein removing comprises a maximum specific grinding energy of not greater than about 2.9 hp min/in$^3$ per 6000 grams/in of initial material removed from the one or more workpieces, not greater than about 2.8 hp min/in$^3$ per 6000 grams/in of initial material removed from the one or more workpieces, not greater than about 2.7 hp min/in$^3$ per 6000 grams/in of initial material removed from the one or more workpieces, not greater than about 2.6 hp min/in$^3$ per 6000 grams/in of material removed from the one or more workpieces, not greater than about 2.5 hp min/in$^3$ per 6000 grams/in of initial material removed from the one or more workpieces, not greater than about 2.4 hp min/in$^3$ per 6000 grams/in of material removed from the one or more workpieces, not greater than about 2.3 hp min/in$^3$ per 6000 grams/in of initial material removed from the one or more workpieces.

Item 16. The method of any one of items 1 and 2, wherein removing comprises a maximum specific grinding energy of not greater than about 2.7 hp min/in$^3$ per 6000 grams/in of initial material removed from the one or more workpieces, not greater than about 2.7 hp min/in$^3$ per 8000 grams/in of initial material removed from the one or more workpieces, not greater than about 2.7 hp min/in$^3$ per 10000 grams/in of initial material removed from the one or more workpieces, not greater than about 2.7 hp min/in$^3$ per 12000 grams/in of material removed from the one or more workpieces.

Item 17. The method of any one of items 1 and 2, wherein removing comprises a maximum specific grinding energy of not greater than about 2.6 hp min/in$^3$ per 8000 grams/in of initial material removed from the one or more workpieces, not greater than about 2.6 hp min/in$^3$ per 9000 grams/in of initial material removed from the one or more workpieces, not greater than about 2.6 hp min/in$^3$ per 10000 grams/in of initial material removed from the one or more workpieces, not greater than about 2.6 hp min/in$^3$ per 11000 grams/in of material removed from the one or more workpieces, not greater than about 2.6 hp min/in$^3$ per 12000 grams/in of initial material removed from the one or more workpieces.

Item 18. The method of any one of items 1 and 2, wherein removing comprises a maximum specific grinding energy of at least about 1 hp min/in$^3$ per 7000 grams/in of initial material removed from the one or more workpieces.

Item 19. The method of any one of items 1 and 2, wherein removing includes moving a coated abrasive article comprising a plurality of shaped abrasive particles relative to a surface of the one or more workpieces at an average material removal rate within a range between at least 6 in$^3$/min/in and not greater than about 25 in$^3$/min/in and wherein the G-ratio variance over the range of average material removal rate is not greater than about 28%, not greater than about 26%, not greater than about 24%, not greater than about 22%, not greater than about 20%.

Item 20. The method of any one of items 1 and 2, wherein each shaped abrasive particle of the plurality of shaped abrasive particles comprises a body having a length (l), a width (w), and a height (h), wherein the width>length, the length>height, and the width>height.

Item 21. The method of any one of items 1 and 2, wherein each shaped abrasive particle of the plurality of shaped abrasive particles comprises a body having a first major surface, a second major surface, and at least one side surface extending between the first major surface and the second major surface.

Item 22. The method of any one of items 1 and 2, wherein each shaped abrasive particle of the plurality of shaped abrasive particles comprises a body having a length (l), a width (w), and a height (h), and wherein the height (h) is at least about 20% of the width (w).

Item 23. The method of any one of items 1 and 2, wherein the height (h) is at least about 400 microns, at least about 450 microns, at least about 475 microns, at least about 500 microns, and not greater than about 3 mm, not greater than about 2 mm, not greater than about 1.5 mm, not greater than about 1 mm, not greater than about 800 microns.

Item 24. The method of any one of items 1 and 2, wherein the width is at least about 600 microns, at least about 700 microns, at least about 800 microns, at least about 900 microns, and not greater than about 4 mm, not greater than about 3 mm, not greater than about 2.5 mm, not greater than about 2 mm.

Item 25. The method of any one of items 1 and 2, wherein each shaped abrasive particle of the plurality of shaped abrasive particles comprises a body having a percent flashing of at least about 1%, such as at least about 2%, at least about 3%, at least about 5%, at least about 8%, at least about 10%, at least about 12%, at least about 15%, at least about 18%, at least about 20%, and not greater than about 40%, not greater than about 35%, not greater than about 30%, not greater than about 25%, not greater than about 20%, not greater than about 18%, not greater than about 15%, not greater than about 12%, not greater than about 10%, not greater than about 8%, not greater than about 6%, not greater than about 4%.

Item 26. The method of any one of items 1 and 2, wherein each shaped abrasive particle of the plurality of shaped abrasive particles comprises a body having a dishing value (d) of not greater than about 2, not greater than about 1.9, not greater than about 1.8, not greater than about 1.7, not greater than about 1.6, not greater than about 1.5, not greater than about 1.2, and at least about 0.9, at least about 1.0.

Item 27. The method of any one of items 1 and 2, wherein each shaped abrasive particle of the plurality of shaped abrasive particles comprises a body having a length (l), a width (w), and a height (h), wherein the body comprises a primary aspect ratio of width:length of at least about 1:1 and not greater than about 10:1.

Item 28. The method of any one of items 1 and 2, wherein each shaped abrasive particle of the plurality of shaped abrasive particles comprises a body having a length (l), a width (w), and a height (h), wherein the body comprises a secondary aspect ratio defined by a ratio of width:height within a range between about 5:1 and about 1:1.

Item 29. The method of any one of items 1 and 2, wherein each shaped abrasive particle of the plurality of shaped abrasive particles comprises a body having a length (l), a width (w), and a height (h), wherein the body comprises a tertiary aspect ratio defined by a ratio of length:height within a range between about 6:1 and about 1:1.

Item 30. The method of any one of items 1 and 2, wherein each shaped abrasive particle of the plurality of shaped abrasive particles comprises a body having a two-dimensional polygonal shape as viewed in a plane defined by a length and width, wherein the body comprises a shape selected from the group consisting of triangular, quadrilateral, rectangular, trapezoidal, pentagonal, hexagonal, heptagonal, octagonal, and a combination thereof, wherein the body comprises a two-dimensional shape as viewed in a plane defined by a length and a width of the body selected from the group consisting of ellipsoids, Greek alphabet characters, Latin alphabet characters, Russian alphabet characters, and a combination thereof.

Item 31. The method of any one of items 1 and 2, wherein each of the shaped abrasive particles of the plurality of shaped abrasive particles have a body having a two-dimensional triangular shape as viewed in a plane defined by a length and a width.

Item 32. The method of any one of items 1 and 2, wherein each shaped abrasive particle of the plurality of shaped abrasive particles comprises a body, and wherein the body is essentially free of a binder, wherein the body is essentially free of an organic material.

Item 33. The method of any one of items 1 and 2, wherein each shaped abrasive particle of the plurality of shaped abrasive particles comprises a body.

Item 34. The method of any one of items 1 and 2, wherein the body comprises a polycrystalline material.

Item 35. The method of any one of items 1 and 2, wherein the polycrystalline material comprises grains, wherein the grains are selected from the group of materials consisting of nitrides, oxides, carbides, borides, oxynitrides, diamond, and a combination thereof.

Item 36. The method of any one of items 1 and 2, wherein the grains comprise an oxide selected from the group of oxides consisting of aluminum oxide, zirconium oxide, titanium oxide, yttrium oxide, chromium oxide, strontium oxide, silicon oxide, and a combination thereof.

Item 37. The method of any one of items 1 and 2, wherein the grains comprise alumina.

Item 38. The method of any one of items 1 and 2, wherein the grains consist essentially of alumina.

Item 39. The method of any one of items 1 and 2, wherein each shaped abrasive particle of the plurality of shaped abrasive particles comprises a body, and wherein the body is formed from a seeded sol gel.

Item 40. The method of any one of items 1 and 2, wherein the plurality of shaped abrasive particles includes a first portion of a batch of abrasive particles, wherein the first portion comprises a majority of a total of abrasive particles of the batch, wherein the first portion comprises a minority of a total of abrasive particles of the batch, wherein the first portion defines at least 1% of a total of abrasive particles of the batch, wherein the first portion defines not greater than about 99% of a total of abrasive particles of the batch.

Item 41. The method of any one of items 1 and 2, further comprising a second portion of the batch distinct from the first portion, wherein the second portion comprises diluent abrasive particles, wherein the second portion comprises a second plurality of shaped abrasive particles having at least one abrasive characteristic distinct from the plurality of shaped abrasive particles of the first portion, wherein the abrasive characteristic is selected from the group consisting of two-dimensional shape, average particle size, particle color, hardness, friability, toughness, density, specific surface area, and a combination thereof.

Item 42. The method of any one of items 1 and 2, wherein each shaped abrasive particle of the plurality of shaped abrasive particles is arranged in a controlled orientation relative to the backing, the controlled orientation including at least one of a predetermined rotational orientation, a predetermined lateral orientation, and a predetermined longitudinal orientation.

Item 43. The method of any one of items 1 and 2, wherein a majority of the shaped abrasive particles of the plurality of shaped abrasive particles are coupled to the backing in a side orientation, wherein at least about 55% of the shaped abrasive particles of the plurality of shaped abrasive particles are coupled to the backing in a side orientation, at least about 60%, at least about 65%, at least about 70%, at least about 75%, at least about 77%, at least about 80%, and not greater than about 99%, not greater than about 95%, not greater than about 90%, not greater than about 85%.

Item 44. The method of any one of items 1 and 2, wherein the coated abrasive article comprises an open coat of the plurality of shaped abrasive particles shaped abrasive particles on the backing, wherein the open coat comprises a coating density of not greater than about 70 particles/cm2, not greater than about 65 particles/cm2, not greater than about 60 particles/cm2, not greater than about 55 particles/cm2, not greater than about 50 particles/cm2, at least about 5 particles/cm2, at least about 10 particles/cm2.

Item 45. The method of any one of items 1 and 2, wherein the coated abrasive article comprises a closed coat of shaped abrasive particles on the backing, wherein the closed coat comprises a coating density of at least about 75 particles/cm2, at least about 80 particles/cm2, at least about 85 particles/cm2, at least about 90 particles/cm2, at least about 100 particles/cm2.

Item 46. The method of any one of items 1 and 2, wherein the coated abrasive article comprises a backing, wherein the plurality of shaped abrasive particles are coupled to the backing, wherein the backing comprises a woven material, wherein the backing comprises a non-woven material, wherein the backing comprises an organic material, wherein the backing comprises a polymer, wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea formaldehyde resin, polyester, polyurethane, polypropylene, polyimides, and a combination thereof.

Item 47. The method of any one of items 1 and 2, wherein the backing comprises an additive chosen from the group consisting of catalysts, coupling agents, curants, anti-static agents, suspending agents, anti-loading agents, lubricants, wetting agents, dyes, fillers, viscosity modifiers, dispersants, defoamers, and grinding agents.

Item 48. The method of any one of items 1 and 2, further comprising an adhesive layer overlying the backing, wherein the adhesive layer comprises a make coat, wherein the make coat overlies the backing, wherein the make coat is bonded directly to a portion of the backing, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 49. The method of any one of items 1 and 2, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

What is claimed is:

1. A method of removing material from one or more workpieces including:
    moving a coated abrasive article comprising a plurality of shaped abrasive particles relative to a surface of the one or more workpieces at a normalized average material removal rate of at least 6 in$^3$/min/in,
    wherein the one or more workpieces comprise stainless steel,
    wherein removing material includes a G-ratio variance of not greater than about 28% for at least two different material removal operation at two different normalized average material removal rates within the range of normalized average material removal rates,
    wherein removing material comprises removing a cumulative amount of material from the one or more workpieces of at least about 7,500 grams/in., and
    wherein the two different normalized average material removal rates differ by at least about 2 in$^3$/min/in.

2. The method of claim 1, wherein the one or more workpieces consist essentially of 304 stainless steel.

3. The method of claim 2, wherein removing material comprises removing a cumulative amount of material from the one or more workpieces of at least about 10,000 grams/in.

4. The method of claim 3, wherein removing comprises a maximum specific grinding energy of not greater than about 2.9 hp min/in$^3$ per 6000 grams/in of initial material removed from the one or more workpieces.

5. The method of claim 1, wherein the normalized average material removal rate is not greater than about 25 in$^3$/min/in.

6. The method of claim 1, wherein each shaped abrasive particle of the plurality of shaped abrasive particles comprises a body having a length (l), a width (w), and a height (h), and wherein the height (h) is at least about 20% of the width (w).

7. The method of claim 1, wherein each shaped abrasive particle of the plurality of shaped abrasive particles comprises a body having a percent flashing of at least about 10%.

8. The method of claim 1, wherein each shaped abrasive particle of the plurality of shaped abrasive particles comprises a body having a two-dimensional polygonal shape as viewed in a plane defined by a length and width, of the body, and wherein the body comprises a shape selected from the group consisting of polygons, ellipsoids, Greek alphabet characters, Latin alphabet characters, Russian alphabet characters, and a combination thereof.

9. The method of claim 1, wherein each shaped abrasive particle of the plurality of shaped abrasive particles comprises a body, and wherein the body is essentially free of a binder.

10. The method of claim 1, wherein the body comprises a polycrystalline material comprising grains, and wherein the grains are selected from the group of materials consisting of nitrides, oxides, carbides, borides, oxynitrides, diamond, and a combination thereof.

11. The method of claim 10, wherein the grains comprise an oxide selected from the group of oxides consisting of aluminum oxide, zirconium oxide, titanium oxide, yttrium oxide, chromium oxide, strontium oxide, silicon oxide, and a combination thereof.

12. The method of claim 1, wherein each shaped abrasive particle of the plurality of shaped abrasive particles comprises a body, and wherein the body is formed from a seeded sol gel.

13. The method of claim 1, wherein the plurality of shaped abrasive particles comprises a first portion of a batch of abrasive particles and a second portion of the batch distinct from the first portion, wherein the second portion comprises a second plurality of shaped abrasive particles having at least one abrasive characteristic distinct from the plurality of shaped abrasive particles of the first portion, and wherein the abrasive characteristic is selected from the group consisting of two-dimensional shape, average particle size, particle color, hardness, friability, toughness, density, specific surface area, and a combination thereof.

14. The method of claim 1, wherein each shaped abrasive particle of the plurality of shaped abrasive particles is arranged in a controlled orientation relative to the backing, the controlled orientation including at least one of a predetermined rotational orientation, a predetermined lateral orientation, and a predetermined longitudinal orientation.

15. The method of claim 1, wherein a majority of the shaped abrasive particles of the plurality of shaped abrasive particles are coupled to a backing in a side orientation.

16. The method of claim 1, wherein the coated abrasive article comprises an open coat of the plurality of shaped abrasive particles shaped abrasive particles on the backing, and wherein the open coat comprises a coating density of not greater than about 70 particles/cm$^2$.

17. The method of claim 1, wherein the coated abrasive article comprises
    a backing,
    a make coat overlying the backing, wherein the plurality of shaped abrasive particles are disposed on the make coat and coupled to the backing, and
    a size coat is disposed overlying the plurality of shaped abrasive particles,
    wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea formaldehyde resin, polyester, polyurethane, polypropylene, polyimides, and a combination thereof,
    wherein the make coat comprises a material selected from the group consisting of polyesters, epoxy resins, polyurethanes, polyamides, polyacrylates, polymethacrylates, poly vinyl chlorides, polyethlene, polysiloxane, silicones, cellulose acetates, nitrocellulose, natural rubber, starch, shellac, and a combination thereof, and wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

18. A method of conducting a high-speed, high-efficiency grinding operation including
   removing a cumulative amount of at least about 7,500 grams/in. of material from one or more workpieces comprising stainless steel at a normalized average material removal rate of at least 6 $in^3$/min/in to not greater than 25 $in^3$/min/in by moving a coated abrasive article relative to a surface of the one or more workpieces,
   wherein the coated abrasive comprises a polymeric binder disposed on a backing material and a plurality of shaped abrasive particles disposed on or in the polymeric binder,
   wherein the coated abrasive is adapted to have a G-ratio variance of not greater than about 30% for two different material removal operations on stainless steel having normalized average material removal rates that are within the range of at least 6 $in^3$/min/in to not greater than 25 $in^3$/min/in and that differ by at least about 2 $in^3$/min/in.

19. The method of claim 18, wherein the stainless steel comprises 304 stainless steel.

20. A method of removing material from a workpiece including:
   abrading a workpiece with a coated abrasive article at a normalized average material removal rate of at least 6 $in^3$/min/in,
   wherein the coated abrasive article comprising a plurality of shaped abrasive particles,
   wherein the workpiece comprises stainless steel,
   wherein the coated abrasive is adapted to achieve a cumulative amount of material removed of at least 10,000 W/in while maintaining a normalized specific grinding energy of not greater than 2.5 Hp/($in^3$/min).

* * * * *